US008702516B2

(12) United States Patent
Bentley et al.

(10) Patent No.: US 8,702,516 B2
(45) Date of Patent: Apr. 22, 2014

(54) MOTION EVENT RECOGNITION SYSTEM AND METHOD

(71) Applicant: Blast Motion, Inc., Burlingame, CA (US)

(72) Inventors: Michael Bentley, San Diego, CA (US); Scott Lohr, San Diego, CA (US); Ryan Kaps, San Diego, CA (US); Bhaskar Bose, San Diego, CA (US); Joe Scarbo, San Diego, CA (US); Juergen Haas, San Diego, CA (US)

(73) Assignee: Blast Motion Inc., Burlingame, AZ (US)

( * ) Notice: Subject to any disclaimer, the term of this patent is extended or adjusted under 35 U.S.C. 154(b) by 0 days.

(21) Appl. No.: 13/914,525

(22) Filed: Jun. 10, 2013

(65) Prior Publication Data

US 2013/0271602 A1 Oct. 17, 2013

Related U.S. Application Data

(63) Continuation-in-part of application No. 13/679,879, filed on Nov. 16, 2012, which is a continuation-in-part of application No. 13/298,158, filed on Nov. 16, 2011, which is a continuation-in-part of application No. 13/267,784, filed on Oct. 6, 2011, which is a continuation-in-part of application No. 13/219,525, filed on Aug. 26, 2011, which is a continuation-in-part of application No. 13/191,309, filed on Jul. 26, 2011, which is a continuation-in-part of application No. 13/046,850, filed on Mar. 15, 2011, now Pat. No. 8,465,376, which is a continuation-in-part of application No. 12/901,806, filed on Oct. 11, 2010, which is a continuation-in-part of application No. 12/866,882, filed on Aug. 26, 2010.

(51) Int. Cl.
*G07F 17/32* (2006.01)

(52) U.S. Cl.
USPC ............... 463/39; 463/40; 463/41; 463/42

(58) Field of Classification Search
USPC ........................................... 463/39–42
See application file for complete search history.

(56) References Cited

U.S. PATENT DOCUMENTS

| 1,712,537 A | 5/1925 | White |
| 3,182,508 A | 5/1965 | Varju |

(Continued)

FOREIGN PATENT DOCUMENTS

| JP | 2004207985 | 7/2004 |
| JP | 2011-000367 | 6/2011 |

(Continued)

OTHER PUBLICATIONS

SureShotGPS SS9000X, Intelligent Touch, Instruction Manual, 25 pages.

(Continued)

*Primary Examiner* — Omkar Deodhar
(74) *Attorney, Agent, or Firm* — ARC IP Law, PC; Joseph J. Mayo

(57) ABSTRACT

Enables recognition of events within motion data including but not limited to motion capture data obtained from portable wireless motion capture elements such as visual markers and sensors, radio frequency identification tags and motion sensors within mobile device computer systems, or calculated based on analyzed movement associated with the same user, other user, historical user or group of users. Provides low power transmission of events. Greatly reduces storage for events such as a shot, move or swing of a player, a concussion of a player, boxer, rider or driver, or a heat stroke, hypothermia, seizure, asthma attack, epileptic attack. Events may be correlated with image(s) as captured from internal/external camera(s) or nanny cam, for example to enable saving video of the event, such as the first steps of a child, violent shaking events, sporting, military or other motion events including concussions, or falling events associated with an elderly person.

23 Claims, 23 Drawing Sheets

(56) References Cited

U.S. PATENT DOCUMENTS

| | | |
|---|---|---|
| 3,226,704 A | 12/1965 | Petrash |
| 3,270,564 A | 9/1966 | Evans |
| 3,788,647 A | 1/1974 | Evans |
| 3,792,863 A | 2/1974 | Evans |
| 3,806,131 A | 4/1974 | Evans |
| 3,945,646 A | 3/1976 | Hammond |
| 4,759,219 A | 7/1988 | Cobb et al. |
| 4,898,389 A | 2/1990 | Plutt |
| 4,910,677 A | 3/1990 | Remedio et al. |
| 4,940,236 A | 7/1990 | Allen |
| 4,991,850 A | 2/1991 | Wilhlem |
| 5,056,783 A | 10/1991 | Matcovich et al. |
| 5,086,390 A | 2/1992 | Matthews |
| 5,111,410 A | 5/1992 | Nakayama et al. |
| 5,127,044 A | 6/1992 | Bonito et al. |
| 5,184,295 A | 2/1993 | Mann |
| 5,230,512 A | 7/1993 | Tattershall |
| 5,233,544 A | 8/1993 | Kobayashi |
| 5,249,967 A | 10/1993 | O'Leary et al. |
| 5,259,620 A | 11/1993 | Marocco |
| 5,283,733 A | 2/1994 | Colley |
| 5,298,904 A | 3/1994 | Olich |
| 5,332,225 A | 7/1994 | Ura |
| 5,333,061 A | 7/1994 | Nakashima et al. |
| 5,364,093 A | 11/1994 | Huston et al. |
| 5,372,365 A | 12/1994 | McTeigue et al. |
| 5,441,256 A | 8/1995 | Hackman |
| 5,441,269 A | 8/1995 | Henwood |
| 5,486,001 A | 1/1996 | Baker |
| 5,524,081 A | 6/1996 | Paul |
| 5,542,676 A | 8/1996 | Howe et al. |
| 5,592,401 A | 1/1997 | Kramer |
| 5,638,300 A | 6/1997 | Johnson |
| 5,665,006 A | 9/1997 | Pellegrini |
| 5,688,183 A | 11/1997 | Sabatino et al. |
| 5,694,340 A | 12/1997 | Kim |
| 5,772,522 A | 6/1998 | Nesbit |
| 5,779,555 A | 7/1998 | Nomura et al. |
| 5,792,001 A | 8/1998 | Henwood |
| 5,819,206 A | 10/1998 | Horton |
| 5,826,578 A | 10/1998 | Curchod |
| 5,868,578 A | 2/1999 | Baum |
| 5,904,484 A | 5/1999 | Burns |
| 5,941,779 A | 8/1999 | Zeiner-Gundersen |
| 5,965,814 A | 10/1999 | French et al. |
| 6,030,109 A | 2/2000 | Lobsenz |
| 6,044,704 A | 4/2000 | Sacher |
| 6,073,086 A | 6/2000 | Marinelli |
| 6,224,493 B1 | 5/2001 | Lee et al. |
| 6,248,021 B1 | 6/2001 | Ognjanovic |
| 6,293,802 B1 | 9/2001 | Ahlgren |
| 6,366,205 B1 | 4/2002 | Sutphen |
| 6,441,745 B1 | 8/2002 | Gates |
| 6,456,938 B1 | 9/2002 | Barnard |
| 6,567,536 B2 | 5/2003 | McNitt |
| 6,582,328 B2 | 6/2003 | Kuta et al. |
| 6,697,820 B1 | 2/2004 | Tarlie |
| 6,705,942 B1 | 3/2004 | Crook et al. |
| 6,746,336 B1 | 6/2004 | Brant et al. |
| 6,757,572 B1 | 6/2004 | Forest |
| 6,774,932 B1 | 8/2004 | Ewing et al. |
| 6,802,772 B1 | 10/2004 | Kunzle et al. |
| 6,900,759 B1 | 5/2005 | Katayama |
| 6,908,404 B1 | 6/2005 | Gard |
| 6,923,729 B2 | 8/2005 | McGinty et al. |
| 7,004,848 B2 | 2/2006 | Konow |
| 7,021,140 B2 | 4/2006 | Perkins |
| 7,037,198 B2 | 5/2006 | Hameen-Antilla |
| 7,118,498 B2 | 10/2006 | Meadows et al. |
| 7,121,962 B2 | 10/2006 | Reeves |
| 7,143,639 B2 | 12/2006 | Gobush |
| 7,160,200 B2 | 1/2007 | Grober |
| 7,175,177 B2 | 2/2007 | Meifu et al. |
| 7,205,894 B1 | 4/2007 | Savage |
| 7,219,033 B2 | 5/2007 | Kolen |
| 7,234,351 B2 | 6/2007 | Perkins |
| 7,264,554 B2 | 9/2007 | Bentley |
| 7,433,805 B2 | 10/2008 | Vock et al. |
| 7,457,439 B1 | 11/2008 | Madsen |
| 7,457,724 B2 | 11/2008 | Vock et al. |
| 7,492,367 B2 | 2/2009 | Mahajan et al. |
| 7,494,236 B2 | 2/2009 | Lim |
| 7,561,989 B2 | 7/2009 | Banks |
| 7,623,987 B2 | 11/2009 | Vock et al. |
| 7,689,378 B2 | 3/2010 | Kolen |
| 7,713,148 B2 | 5/2010 | Sweeney |
| 7,736,242 B2 | 6/2010 | Stites et al. |
| 7,771,263 B2 | 8/2010 | Telford |
| 7,780,450 B2 | 8/2010 | Tarry |
| 7,800,480 B1 | 9/2010 | Joseph et al. |
| 7,813,887 B2 | 10/2010 | Vock et al. |
| 7,831,212 B1 | 11/2010 | Balardeta et al. |
| 7,871,333 B1 | 1/2011 | Davenport |
| 7,966,154 B2 | 6/2011 | Vock et al. |
| 7,983,876 B2 | 7/2011 | Vock et al. |
| 8,036,826 B2 | 10/2011 | MacIntosh et al. |
| 8,117,888 B2 | 2/2012 | Chan et al. |
| 8,172,722 B2 | 5/2012 | Molyneux et al. |
| 8,231,506 B2 | 7/2012 | Molyneux et al. |
| 8,249,831 B2 | 8/2012 | Vock et al. |
| 8,257,191 B2 | 9/2012 | Stites et al. |
| 8,400,548 B2 | 3/2013 | Bilbrey et al. |
| 8,425,292 B2 | 4/2013 | Lui et al. |
| 2001/0029207 A1 | 10/2001 | Cameron et al. |
| 2001/0035880 A1 | 11/2001 | Musatov et al. |
| 2001/0045904 A1 | 11/2001 | Silzer, Jr. |
| 2001/0049636 A1 | 12/2001 | Hudda et al. |
| 2002/0004723 A1 | 1/2002 | Meifu et al. |
| 2002/0019677 A1 | 2/2002 | Lee |
| 2002/0049507 A1 | 4/2002 | Hameen-Anttila |
| 2002/0052750 A1 | 5/2002 | Hirooka |
| 2002/0064764 A1 | 5/2002 | Fishman |
| 2002/0072815 A1 | 6/2002 | McDonough et al. |
| 2002/0077189 A1 | 6/2002 | Tuer et al. |
| 2002/0082775 A1 | 6/2002 | Meadows et al. |
| 2002/0151994 A1 | 10/2002 | Sisco |
| 2002/0173364 A1 | 11/2002 | Boscha |
| 2002/0177490 A1 | 11/2002 | Yong et al. |
| 2002/0188359 A1 | 12/2002 | Morse |
| 2003/0008722 A1 | 1/2003 | Konow |
| 2003/0191547 A1 | 10/2003 | Morse |
| 2004/0147329 A1 | 7/2004 | Meadows et al. |
| 2004/0227676 A1 | 11/2004 | Kim et al. |
| 2005/0021292 A1* | 1/2005 | Vock et al. ............. 702/182 |
| 2005/0032582 A1 | 2/2005 | Mahajan et al. |
| 2005/0054457 A1 | 3/2005 | Eyestone et al. |
| 2005/0215340 A1 | 9/2005 | Stites et al. |
| 2005/0227775 A1 | 10/2005 | Cassady et al. |
| 2005/0261073 A1 | 11/2005 | Farrington, Jr. et al. |
| 2005/0268704 A1 | 12/2005 | Bissonnette et al. |
| 2005/0272516 A1 | 12/2005 | Gobush |
| 2005/0282650 A1 | 12/2005 | Miettinen et al. |
| 2005/0288119 A1 | 12/2005 | Wang et al. |
| 2006/0025229 A1 | 2/2006 | Mahajan et al. |
| 2006/0063600 A1 | 3/2006 | Grober |
| 2006/0084516 A1 | 4/2006 | Eyestone et al. |
| 2006/0109116 A1 | 5/2006 | Keays |
| 2006/0122002 A1 | 6/2006 | Konow |
| 2006/0189389 A1 | 8/2006 | Hunter et al. |
| 2006/0199659 A1 | 9/2006 | Caldwell |
| 2006/0270450 A1 | 11/2006 | Garratt et al. |
| 2006/0276256 A1 | 12/2006 | Storek |
| 2007/0052807 A1 | 3/2007 | Zhou et al. |
| 2007/0087866 A1 | 4/2007 | Meadows et al. |
| 2007/0099715 A1 | 5/2007 | Jones et al. |
| 2007/0111811 A1 | 5/2007 | Grober |
| 2007/0129178 A1 | 6/2007 | Reeves |
| 2007/0135225 A1 | 6/2007 | Nieminen |
| 2007/0135237 A1 | 6/2007 | Reeves |
| 2007/0219744 A1 | 9/2007 | Kolen |
| 2007/0270214 A1 | 11/2007 | Bentley |
| 2007/0298896 A1 | 12/2007 | Nusbaum |
| 2008/0108456 A1 | 5/2008 | Bonito |
| 2008/0280642 A1 | 11/2008 | Coxhill et al. |

(56) References Cited

U.S. PATENT DOCUMENTS

| | | | |
|---|---|---|---|
| 2009/0017944 | A1 | 1/2009 | Savarese et al. |
| 2009/0029754 | A1 | 1/2009 | Slocum et al. |
| 2009/0033741 | A1 | 2/2009 | Oh et al. |
| 2009/0036237 | A1 | 2/2009 | Nipper et al. |
| 2009/0088276 | A1 | 4/2009 | Solheim et al. |
| 2009/0111602 | A1 | 4/2009 | Savarese et al. |
| 2009/0131190 | A1 | 5/2009 | Kimber |
| 2009/0137333 | A1 | 5/2009 | Lin et al. |
| 2009/0174676 | A1 | 7/2009 | Westerman |
| 2009/0177097 | A1 | 7/2009 | Ma et al. |
| 2009/0209358 | A1 | 8/2009 | Niegowski |
| 2009/0213134 | A1 | 8/2009 | Stephanick et al. |
| 2009/0233735 | A1 | 9/2009 | Savarese et al. |
| 2010/0049468 | A1 | 2/2010 | Papadourakis |
| 2010/0062869 | A1 | 3/2010 | Chung et al. |
| 2010/0063778 | A1 | 3/2010 | Schrock et al. |
| 2010/0063779 | A1 | 3/2010 | Schrock et al. |
| 2010/0093458 | A1 | 4/2010 | Davenport et al. |
| 2010/0099509 | A1 | 4/2010 | Ahem et al. |
| 2010/0113174 | A1 | 5/2010 | Ahern |
| 2010/0130298 | A1 | 5/2010 | Dugan et al. |
| 2010/0144414 | A1 | 6/2010 | Edis et al. |
| 2010/0144456 | A1 | 6/2010 | Ahern |
| 2010/0216564 | A1 | 8/2010 | Stites et al. |
| 2010/0222152 | A1 | 9/2010 | Jaekel et al. |
| 2010/0308105 | A1 | 12/2010 | Savarese et al. |
| 2011/0037778 | A1 | 2/2011 | Deng et al. |
| 2011/0050864 | A1 | 3/2011 | Bond |
| 2011/0052005 | A1 | 3/2011 | Selner |
| 2011/0053688 | A1 | 3/2011 | Crawford |
| 2011/0075341 | A1 | 3/2011 | Lau et al. |
| 2011/0165998 | A1 | 7/2011 | Lau et al. |
| 2011/0230273 | A1 | 9/2011 | Niegowski et al. |
| 2011/0230274 | A1 | 9/2011 | Lafortune et al. |
| 2011/0230985 | A1 | 9/2011 | Niegowski et al. |
| 2011/0230986 | A1 | 9/2011 | Lafortune |
| 2011/0305369 | A1 | 12/2011 | Bentley |
| 2012/0115682 | A1 | 5/2012 | Homsi |
| 2013/0110415 | A1 | 5/2013 | Davis et al. |

FOREIGN PATENT DOCUMENTS

| | | |
|---|---|---|
| KR | 10-2003-0085275 | 5/2003 |
| KR | 10-2006-0041060 | 5/2006 |
| KR | 10-2007-0119018 | 12/2007 |
| KR | 10-2010-0074068 | 1/2010 |
| KR | 10-2010-0020131 | 2/2010 |
| KR | 10-1079319 | 4/2011 |
| WO | 94/27683 | 8/1994 |
| WO | 2011057194 | 5/2011 |

OTHER PUBLICATIONS

International Search Report received for PCT Application No. PCT/US2012/065716, dated Jan. 3, 2013, 10 pages.

myCaddie, 2009, retrieved on Sep. 26, 2012 from http://www.iMakePars.com, 4 pages.

Swing it See it Fix it, Improve Gold Swing, SwingSmart Golf Analyzer, retrieved on Sep. 26, 2012 from http://www.SwingSmart.com, 2 pages.

Learn how Swingbyte can improve your game, retrieved on Sep. 26, 2012 from http://www.swingbyte.com, 2 pages.

International Search Report received for PCT Application No. PCT/US2011/055173.

International Search Report received for PCT Application No. PCT/US2011/049461.

PCT Search Report, PCT/US2012/029310, dated Sep. 28, 2012, 3 pages.

IPER, PCT/US2011/049461, dated Mar. 7, 2013, 6 pages.

IPER, PCT/US2011/049461, dated May 10, 2013, 5 pages.

IPER, PCT/US2011/055173, dated Apr. 25, 2013, 5 pages.

International Search Report for PCT Application No. PCT/US2013/021999, dated Apr. 30, 2013, 8 pages.

The Nike+FuelBand User's Guide, rev 14, 26 pages.

UP by Jawbone Extended User Guide, 10 pages.

Armour39, Under Armour Guarantee, Getting Started, retrieved from the Internet on Jul. 12, 2013, 7 pages.

Armour39 Module & Chest Strap, retrieved from the Internet on Jul. 12, 2013, 6 pages.

miCoach Pacer User Manual, 31 pages.

Foreman et al. "A Comparative Analysis for the Measurement of Head Accelerations in Ice Hockey Helmets using Non-Accelerometer Based Systems," Nov. 19, 2012, 13 pages.

Reebok-CCM and MC10 to Launch Revolutionary Sports Impact Indicator, MC10 News (http://www.mc10inc.com/news/), Oct. 24, 2012, 3 pages.

CheckLight MC10 Overview, Reebok International Limited, Nov. 20, 2012, 7 pages.

Reebok and MC10 Team Up to Build CheckLight, a Head Impact Indicator (Hands-on), MC10 News (http://www.mc10inc.com/news/), Jan. 11, 2013, 1 pg.

Trace—The Most Advanced Activity Monitor for Action Sports, webpage, retrieved on Aug. 6, 2013, 22 pages.

CheckLight, Sports/Activity Impact Indicator, User Manual, 13 pages, 2013, Reebok International Limited.

King, the Design and Application of Wireless Mems Inertial Measurement Units for the Measurement and Analysis of Golf Swings, 2008.

Grober, an Accelerometer Based Instrumentation of the Golf Club: Comparative Analysis of Golf Swings, 2009.

Gehrig et al, Visual Golf Club Tracking for Enhanced Swing Analysis, Computer Vision Lab, Lausanne, Switzerland, undated.

Pocketpro Golf Designs, PocketPro Full Swing Analysis in Your Pocket, www.PocketPro.org.

Clemson University, Golf Shot Tutorial, http://www.webnucleo.org/home/online_tools/newton/0.4/html/about_this_tool/tutorials/golf_1.shp.cgi, retrieved on Aug. 11, 2013.

miCoach SPEED_CELL TM, User Manual, 23 pages.

Nike+iPod, User Guide, 32 pages.

ActiveReply, "TRACE—The Most Advanced Activity Monitor for Action Sports", http://www.kickstarter.com/projects/activereplay/trace-the-most-advanced-activity-monitor-for-actio, 13 pages, Jul. 31, 2013.

* cited by examiner

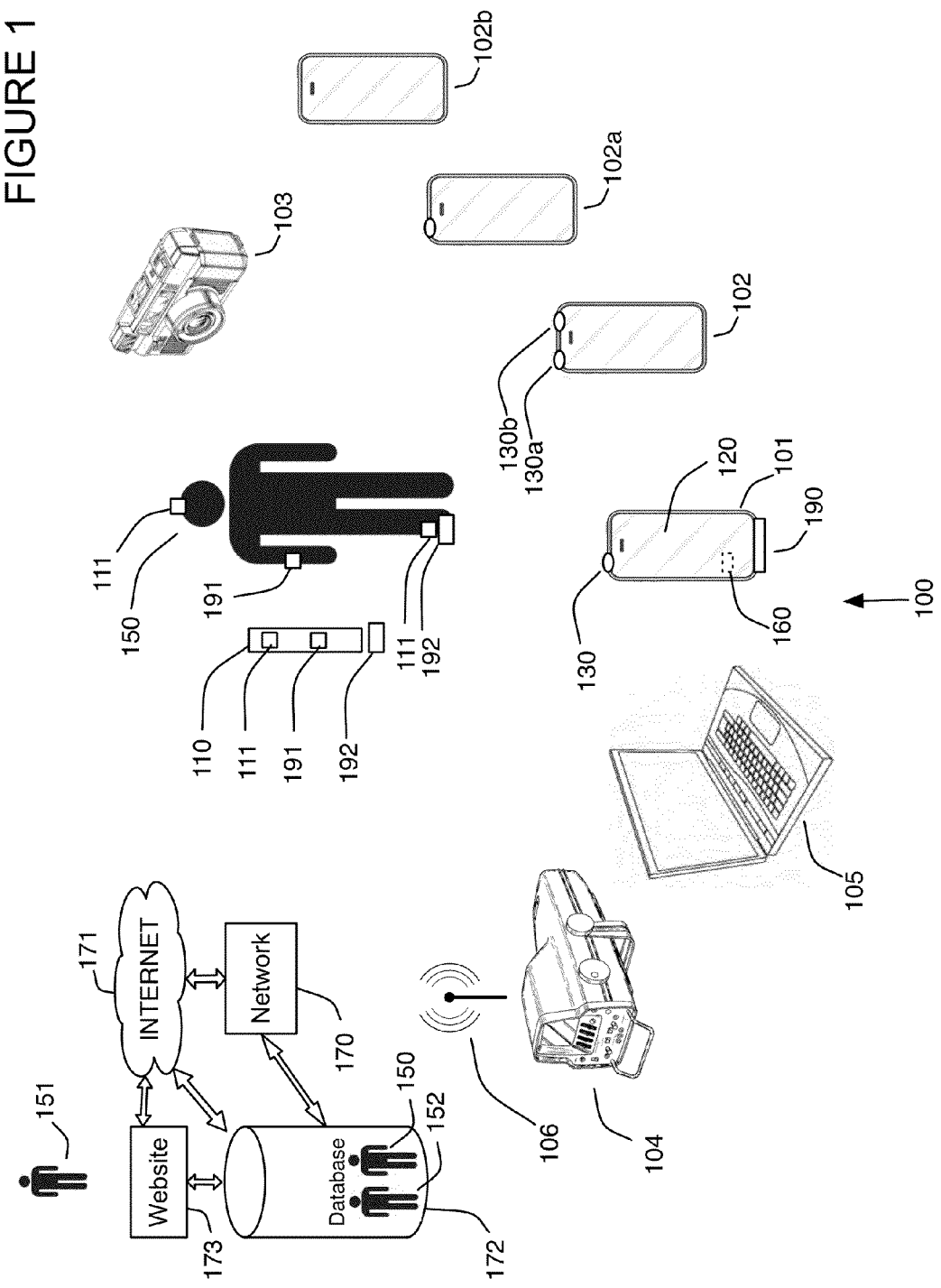

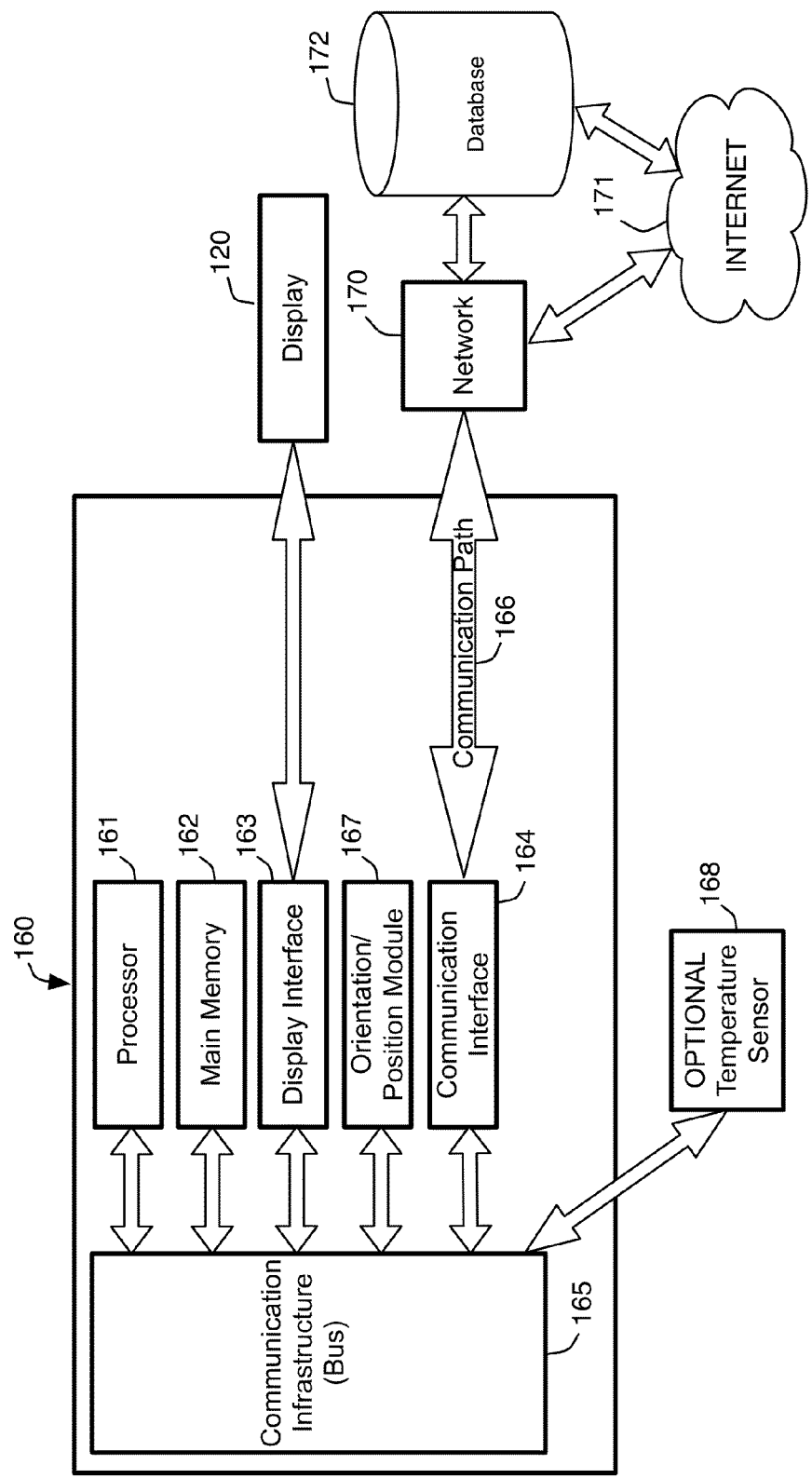

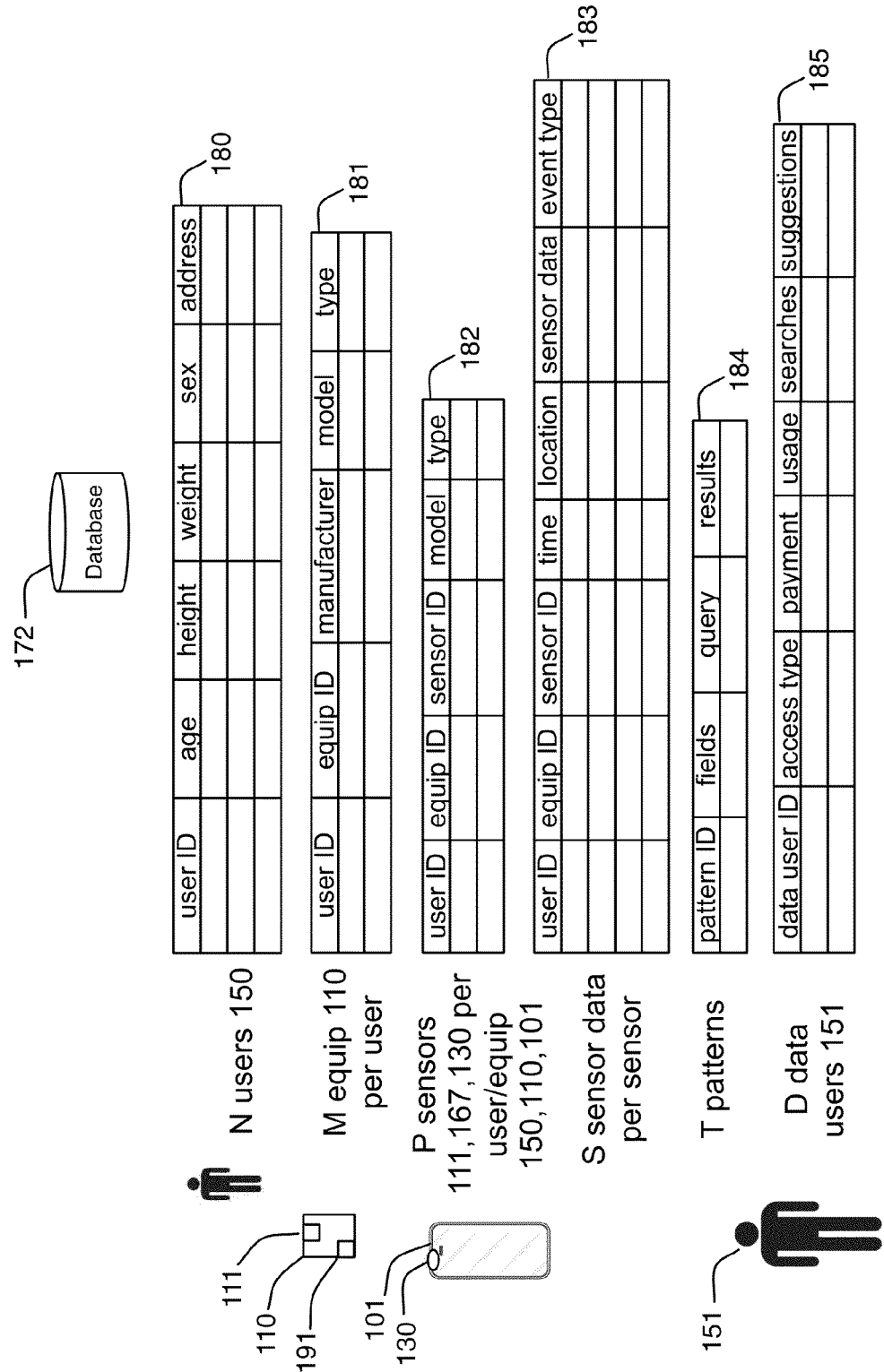

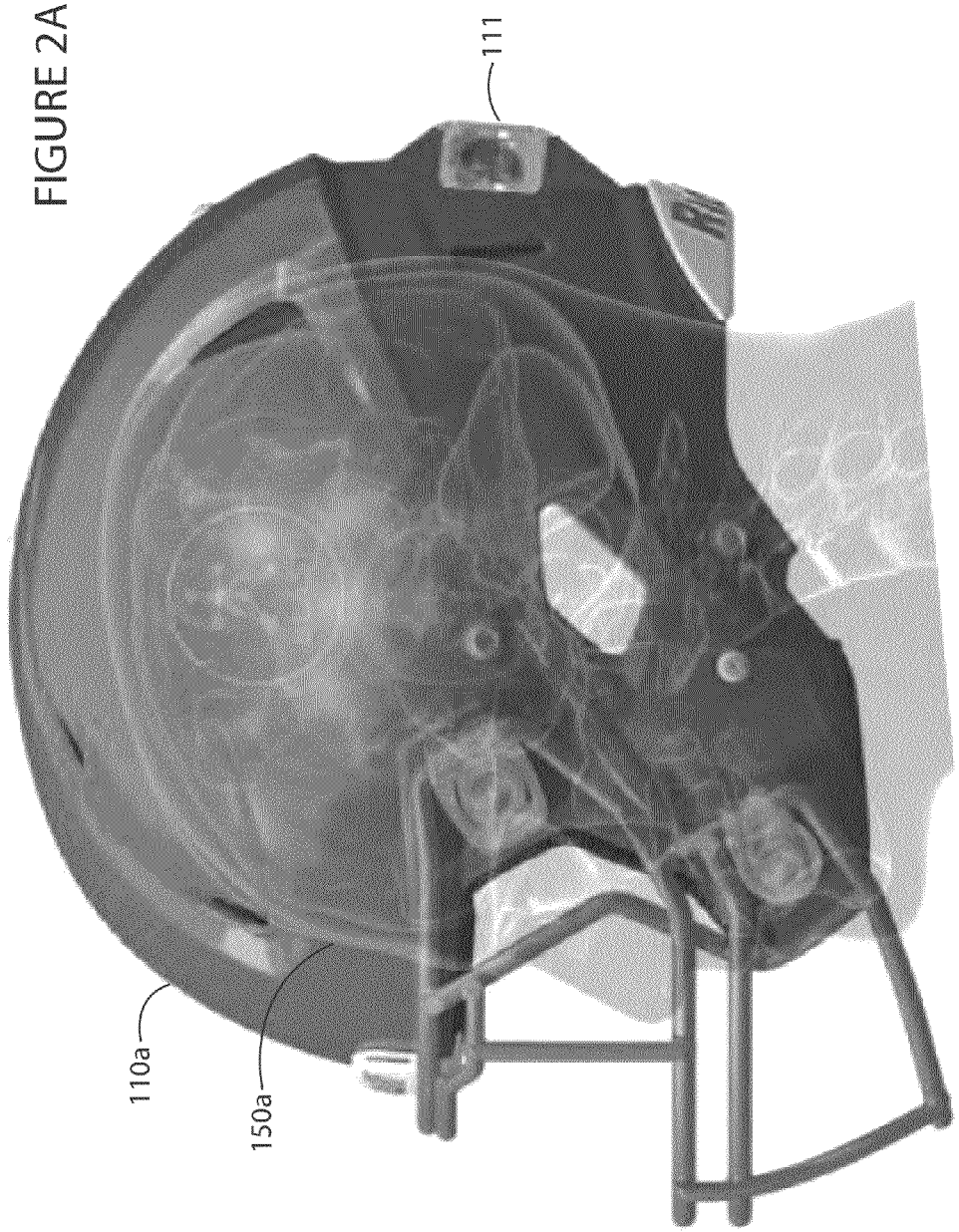

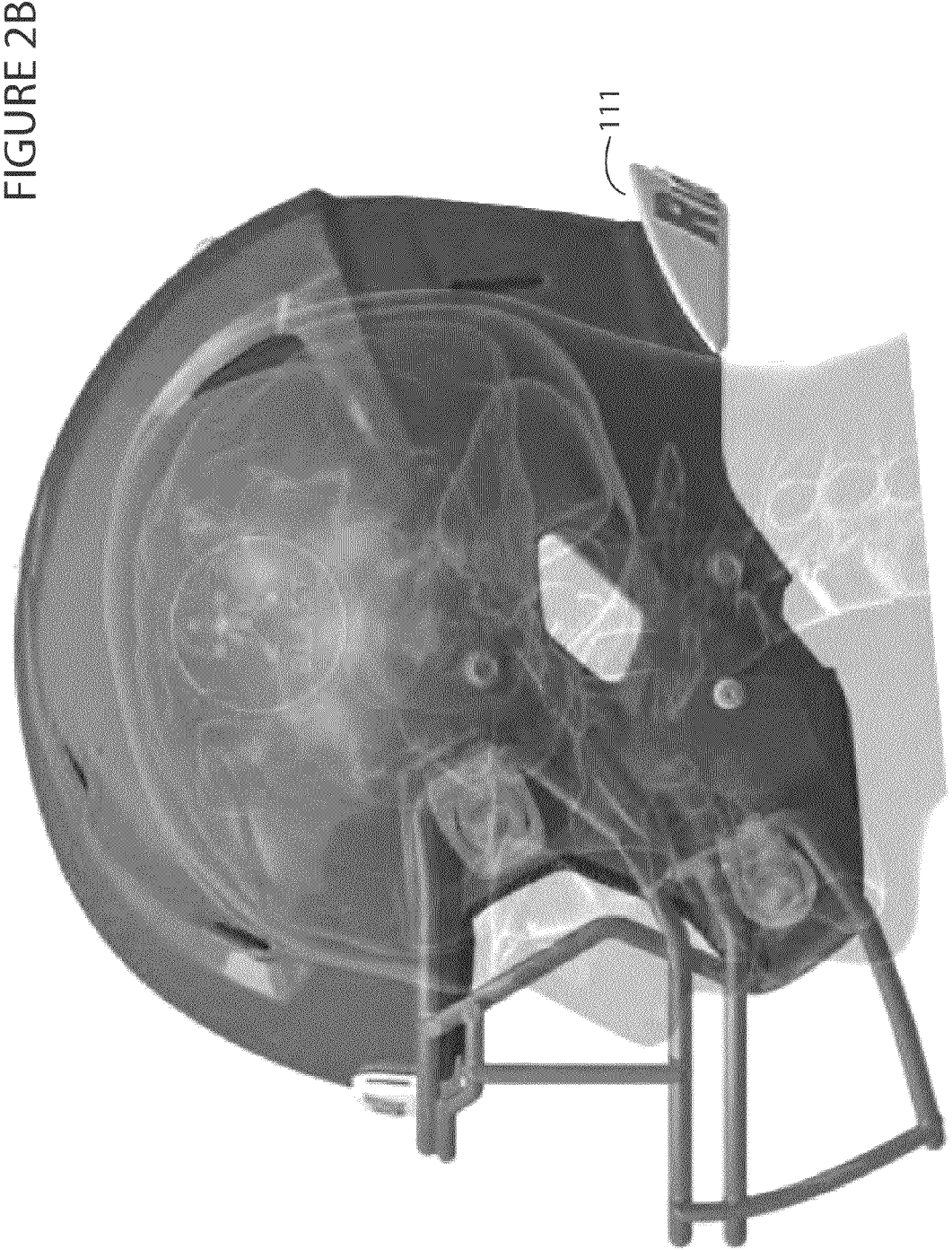

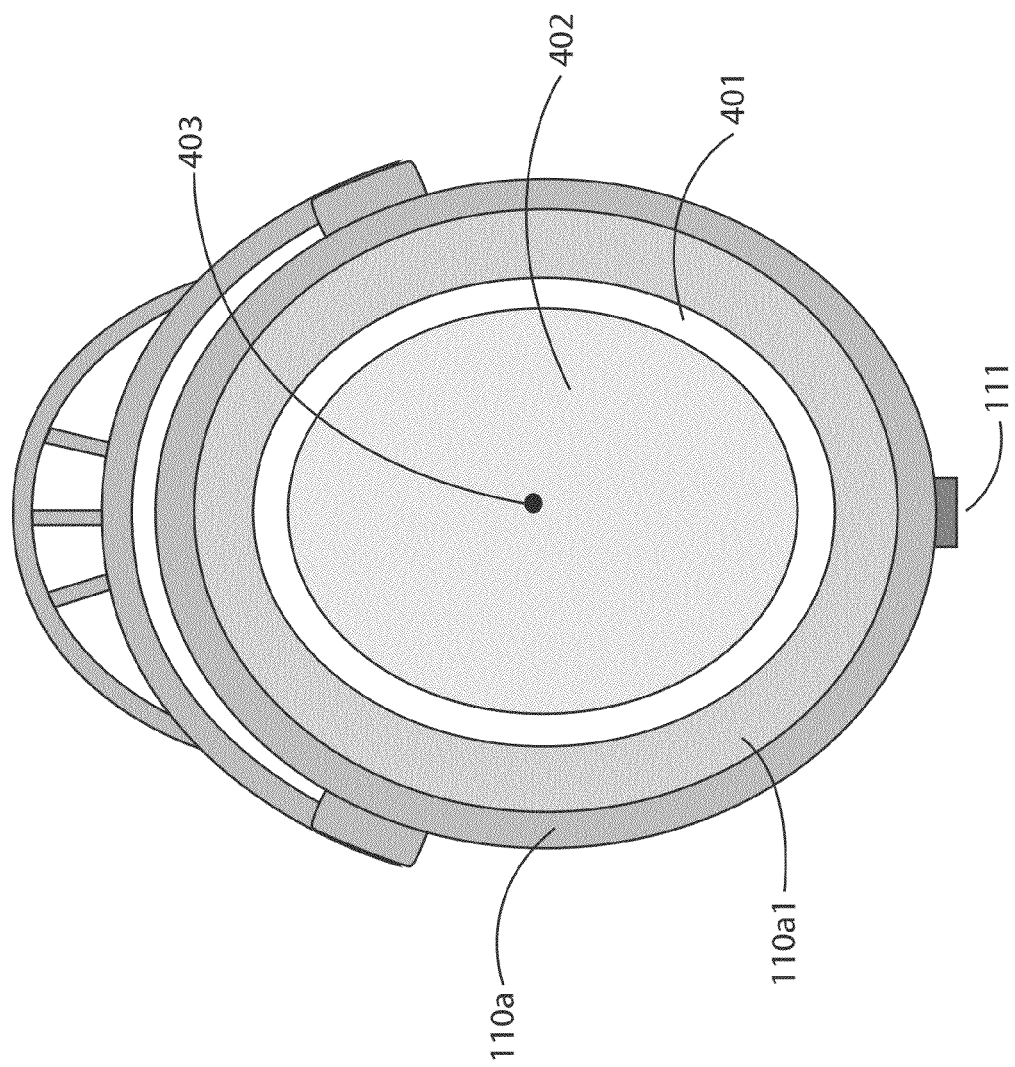

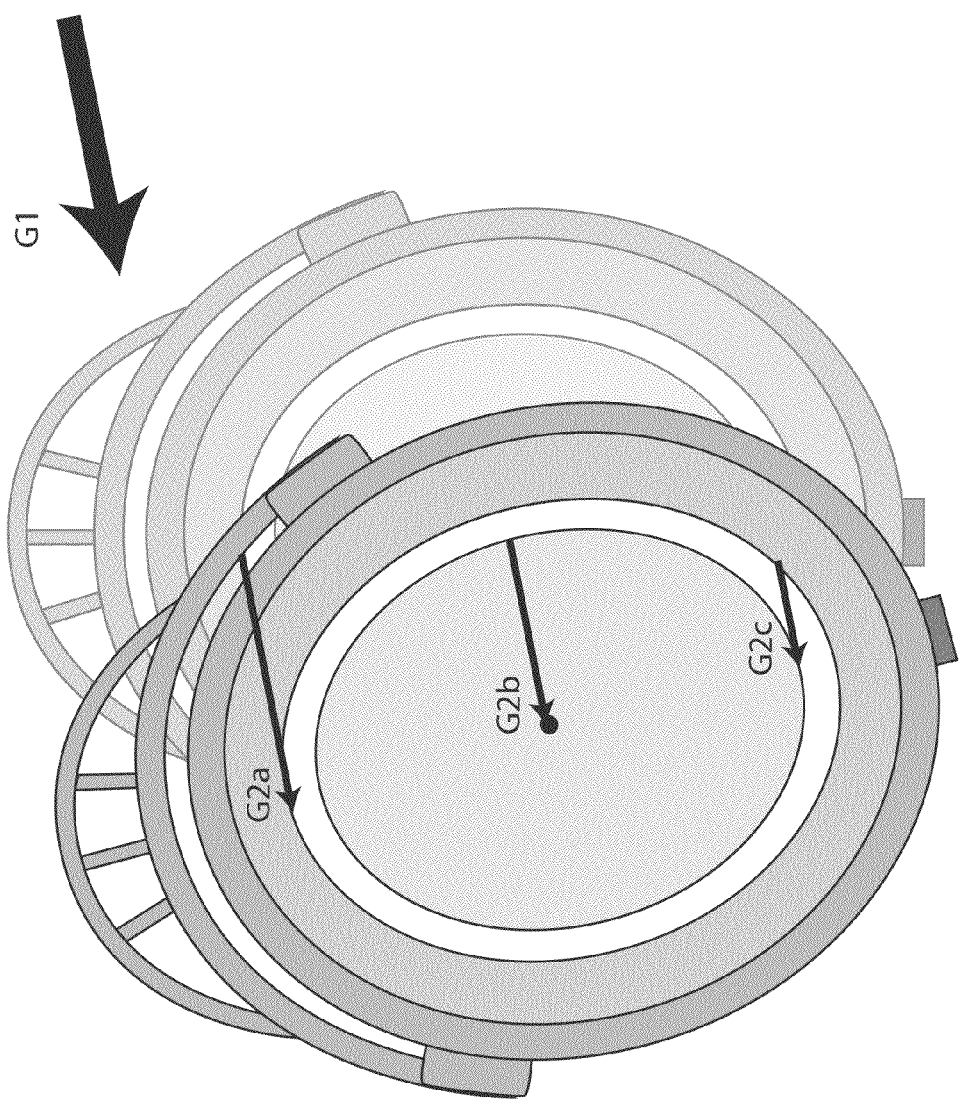

X Rotational Acceleration
200 radians / $s^2$

Y Rotational Acceleration
300 radians / $s^2$

Rotational Acceleration
1700 radians / $s^2$

Z Rotational Acceleration
1500 radians / $s^2$

FIGURE 14
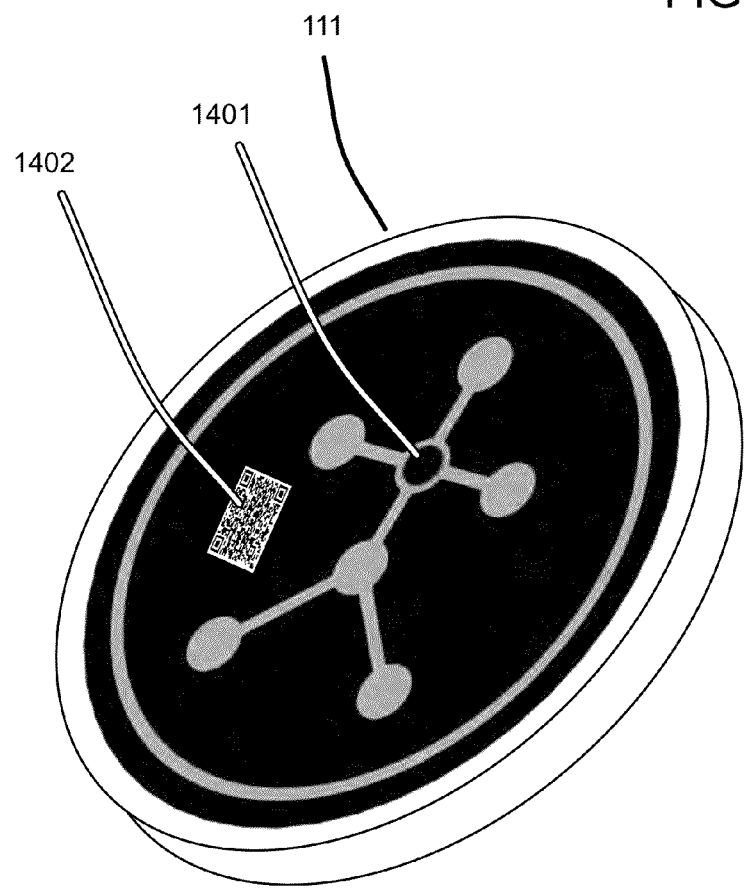
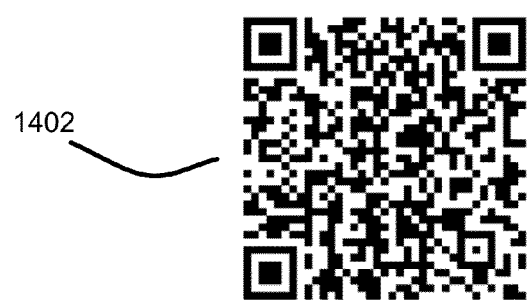

FIGURE 17
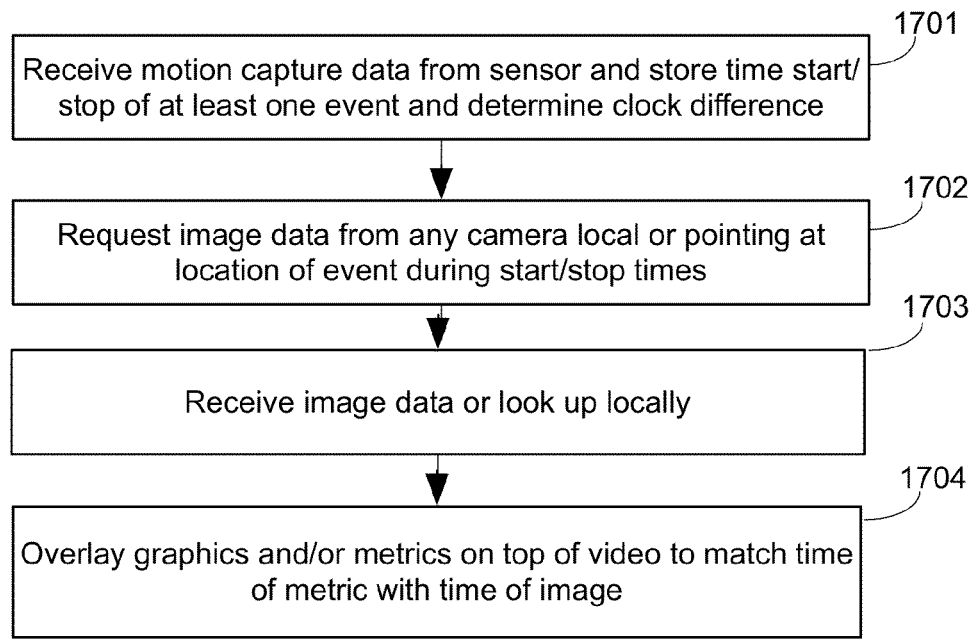

MOTION EVENT RECOGNITION SYSTEM AND METHOD

This application is a continuation-in-part of U.S. Utility patent application Ser. No. 13/679,879 filed 16 Nov. 2012, which is a continuation-in-part of U.S. Utility patent application Ser. No. 13/298,158 filed 16 Nov. 2011, which is a continuation-in-part of U.S. Utility patent application Ser. No. 13/267,784 filed 6 Oct. 2011, which is a continuation-in-part of U.S. Utility patent application Ser. No. 13/219,525 filed 26 Aug. 2011, which is a continuation-in-part of U.S. Utility patent application Ser. No. 13/191,309 filed 26 Jul. 2011, which is a continuation-in-part of U.S. Utility patent application Ser. No. 13/048,850 filed 15 Mar. 2011, which is a continuation-in-part of U.S. Utility patent application Ser. No. 12/901,806 filed 11 Oct. 2010, which is a continuation-in-part of U.S. Utility patent application Ser. No. 12/868,882 filed 26 Aug. 2010, the specifications of which are hereby incorporated herein by reference.

BACKGROUND OF THE INVENTION

1. Field of the Invention

One or more embodiments pertain to the field of motion capture data analysis and displaying information based on events recognized within the motion capture data or within motion analysis data associated with a user, or piece of equipment and/or based on previous motion analysis data from the user or other user(s) and/or piece of equipment. More particularly, but not by way of limitation, one or more embodiments enable a motion event recognition system and method that enables recognition of events within motion data including but not limited to a shot, move or swing of a player, a concussion of a player, boxer, rider or driver, or a heat stroke, hypothermia, seizure, asthma attack, epileptic attack or any other sporting or physical motion related event including walking and falling. Motion events may be correlated with image(s) as captured from internal/external camera(s) or nanny cam, for example to enable saving video of the event, such as the first steps of a child, violent shaking events, sporting, military or other motion events including concussions, or falling events associated with an elderly person.

2. Description of the Related Art

Existing motion capture systems process and potentially store enormous amounts of data with respect to the actual events of interest. For example, known systems capture accelerometer data from sensors coupled to a user or piece of equipment and analyze or monitor movement. In these scenarios, thousands or millions of motion capture samples are associated with the user at rest or not moving in a manner that is related to a particular event that the existing systems are attempting to analyze. For example, if monitoring a football player, a large amount of motion data is not related to a concussion event, for a baby, a large amount of motion data is not related in general to a shaking event or non-motion event such as sudden infant death syndrome (SIDS), for a golfer, a large amount of motion data captured by a sensor mounted on the player's golf club is of low acceleration value, e.g., associated with the player standing or waiting for a play or otherwise not moving or accelerating in a manner of interest. Hence, capturing, transferring and storing non-event related data increases requirements for power, bandwidth and memory.

Some systems that are related to monitoring impacts are focused on linear acceleration related impacts. These systems are unable to monitor rotational accelerations or velocities and are therefore unable to detect certain types of events that may produce concussions. In addition, many of these types of systems do not produce event related, connectionless messages for low power and longevity considerations. Hence, these systems are limited in their use based on their lack of robust characteristics.

Known systems also do not contemplate data mining of events within motion data to form a representation of a particular movement, for example a swing of an average player or average professional player level, or any player level based on a function of events recognized within previously stored motion data. Thus, it is difficult and time consuming and requires manual labor to find, trim and designate particular motion related events for use in virtual reality for example. Hence, current systems do not easily enable a particular user to play against a previously stored motion event of the same user or other user along with a historical player for example. Furthermore, known systems do not take into account cumulative impacts, and for example with respect to data mined information related to concussions, to determine if a series of impacts may lead to impaired brain function over time.

Other types of motion capture systems include video systems that are directed at analyzing and teaching body mechanics. These systems are based on video recording of an athlete and analysis of the recorded video of an athlete. This technique has various limitations including inaccurate and inconsistent subjective analysis based on video for example. Another technique includes motion analysis, for example using at least two cameras to capture three-dimensional points of movement associated with an athlete. Known implementations utilize a stationary multi-camera system that is not portable and thus cannot be utilized outside of the environment where the system is installed, for example during an athletic event such as a golf tournament, football game or to monitor a child or elderly person. In general video based systems do not also utilize digital motion capture data from sensors on the object undergoing motion since they are directed at obtaining and analyzing images having visual markers instead of electronic sensors. These fixed installations are extremely expensive as well. Such prior techniques are summarized in U.S. Pat. No. 7,264,554, filed 26 Jan. 2006, which claims the benefit of U.S. Provisional Patent Application Ser. No. 60/647,751 filed 26 Jan. 2005, the specifications of which are both hereby incorporated herein by reference. Both disclosures are to the same inventor of the subject matter of the instant application.

Regardless of the motion capture data obtained, the data is generally analyzed on a per user or per swing basis that does not contemplate processing on a mobile phone, so that a user would only buy a motion capture sensor and an "app" for a pre-existing mobile phone. In addition, existing solutions do not contemplate mobile use, analysis and messaging and/or comparison to or use of previously stored motion capture data from the user or other users or data mining of large data sets of motion capture data, for example to obtain or create motion capture data associated with a group of users, for example professional golfers, tennis players, baseball players or players of any other sport to provide events associated with a "professional level" average or exceptional virtual reality opponent. To summarize, motion capture data is generally used for immediate monitoring or sports performance feedback and generally has had limited and/or primitive use in other fields.

Known motion capture systems generally utilize several passive or active markers or several sensors. There are no known systems that utilize as little as one visual marker or sensor and an app that for example executes on a mobile device that a user already owns, to analyze and display motion capture data associated with a user and/or piece of equipment. The data is generally analyzed in a laboratory on a per user or per swing basis and is not used for any other purpose besides motion analysis or representation of motion of that particular user and is generally not subjected to data mining.

There are no known systems that allow for motion capture elements such as wireless sensors to seamlessly integrate or otherwise couple with a user or shoes, gloves, shirts, pants, belts, or other equipment, such as a baseball bat, tennis racquet, golf club, mouth piece for a boxer, football or soccer player, or protective mouthpiece utilized in any other contact sport for local analysis or later analysis in such a small format that the user is not aware that the sensors are located in or on these items. There are no known systems that provide seamless mounts, for example in the weight port of a golf club or at the end shaft near the handle so as to provide a wireless golf club, configured to capture motion data. Data derived from existing sensors is not saved in a database for a large number of events and is not used relative to anything but the performance at which the motion capture data was acquired.

In addition, for sports that utilize a piece of equipment and a ball, there are no known portable systems that allow the user to obtain immediate visual feedback regarding ball flight distance, swing speed, swing efficiency of the piece of equipment or how centered an impact of the ball is, i.e., where on the piece of equipment the collision of the ball has taken place. These systems do not allow for user's to play games with the motion capture data acquired from other users, or historical players, or from their own previous performances. Known systems do not allow for data mining motion capture data from a large number of swings to suggest or allow the searching for better or optimal equipment to match a user's motion capture data and do not enable original equipment manufacturers (OEMs) to make business decisions, e.g., improve their products, compare their products to other manufacturers, up-sell products or contact users that may purchase different or more profitable products.

In addition, there are no known systems that utilize motion capture data mining for equipment fitting and subsequent point-of-sale decision making for instantaneous purchasing of equipment that fits an athlete. Furthermore, no known systems allow for custom order fulfillment such as assemble-to-order (ATO) for custom order fulfillment of sporting equipment, for example equipment that is built to customer specifications based on motion capture data mining, and shipped to the customer to complete the point of sales process, for example during play or virtual reality play.

In addition, there are no known systems that use a mobile device and RFID tags for passive compliance and monitoring applications.

There are no known systems that enable data mining for a large number of users related to their motion or motion of associated equipment to find patterns in the data that allows for business strategies to be determined based on heretofore undiscovered patterns related to motion. There are no known systems that enable obtain payment from OEMs, medical professionals, gaming companies or other end users to allow data mining of motion data. For at least the limitations described above there is a need for a motion event recognition system and method.

BRIEF SUMMARY OF THE INVENTION

Embodiments of the invention enable a motion event recognition system and method, that provides intelligent recognition of events within motion data including but not limited to motion capture data obtained from portable wireless motion capture elements such as visual markers and sensors, radio frequency identification tags and mobile device computer systems, or calculated based on analyzed movement associated with the same user, other user, historical user or group of users. Embodiments enable event based viewing and low power transmission of events and communication with an app executing on a mobile device and/or with external cameras to designate windows that define the events. Enables recognition of motion events, and designation of events within images or videos, such as a shot, move or swing of a player, a concussion of a player, boxer, rider or driver, or a heat stroke, hypothermia, seizure, asthma attack, epileptic attack or any other sporting or physical motion related event including walking and falling. Events may be correlated with one or more images or video as captured from internal/external camera or cameras or nanny cam, for example to enable saving video of the event, such as the first steps of a child, violent shaking events, sporting events including concussions, or falling events associated with an elderly person. Concussion related events and other events may be monitored for linear acceleration thresholds and/or patterns as well as rotational acceleration and velocity thresholds and/or patterns and/or saved on an event basis and/or transferred over lightweight connectionless protocols or any combination thereof.

Embodiments of the invention enable a user to purchase an application or "app" and a motion capture element and immediately utilize the system with their existing mobile computer, e.g., mobile phone. Embodiments of the invention may display motion information to a monitoring user, or user associated with the motion capture element or piece of equipment. Embodiments may also display information based on motion analysis data associated with a user or piece of equipment based on (via a function such as but not limited to a comparison) previously stored motion capture data or motion analysis data associated with the user or piece of equipment or previously stored motion capture data or motion analysis data associated with at least one other user. This enables sophisticated monitoring, compliance, interaction with actual motion capture data or pattern obtained from other user(s), for example to play a virtual game using real motion data obtained from the user with responses generated based thereon using real motion data capture from the user previously or from other users (or equipment). This capability provides for playing against historical players, for example a game of virtual tennis, or playing against an "average" professional sports person, and is unknown in the art until now.

For example, one or more embodiments include at least one motion capture element configured to couple with a user or piece of equipment or mobile device coupled with the user, wherein the at least one motion capture element includes a memory, a sensor configured to capture any combination of values associated with an orientation, position, velocity, acceleration (linear and/or rotational) of the at least one motion capture element, a radio, and a microcontroller coupled with the memory, the sensor and the radio. The microcontroller is configured to collect data that includes sensor values from the sensor, store the data in the memory, analyze the data and recognize an event within the data to determine event data and transmit the event data associated with the event via the radio. Embodiments of the system may also include an application configured to execute on a mobile device wherein the mobile device includes a computer, a wireless communication interface configured to communicate with the radio to obtain the event data associated with the event. The computer is coupled with wireless communication interface wherein the computer executes the application or "app" to configure the computer to receive the event data from the wireless communication interface, analyze the event data to form motion analysis data, store the event data, or the motion analysis data, or both the event data and the motion analysis data, and display information comprising the event data, or the motion analysis data, or both associated with the at least one user on a display.

One or more embodiments include at least one motion capture sensor that is configured to be placed near the user's head wherein the microcontroller is further configured to calculate of a location of impact on the user's head. Embodiments of the at least one motion capture sensor may be configured to be coupled on a hat or cap, within a protective mouthpiece, using any type of mount, enclosure or coupling mechanism. One or more embodiments of the at least one motion capture sensor may be configured to be coupled with a helmet on the user's head and wherein the calculation of the location of impact on the user's head is based on the physical geometry of the user's head and/or helmet. Embodiments may include a temperature sensor coupled with the at least one motion capture sensor or with the microcontroller for example.

Embodiments of the invention may also utilize an isolator configured to surround the at least one motion capture element to approximate physical acceleration dampening of cerebrospinal fluid around the user's brain to minimize translation of linear acceleration and rotational acceleration of the event data to obtain an observed linear acceleration and an observed rotational acceleration of the user's brain. Thus, embodiments may eliminate processing to translate forces or acceleration values or any other values from the helmet based acceleration to the observed brain acceleration values. Therefore, embodiments utilize less power and storage to provide event specific data, which in turn minimizes the amount of data transfer, which yields lower transmission power utilization and even lower total power utilization. Different isolators may be utilized on a football/hockey/lacrosse player's helmet based on the type of padding inherent in the helmet. Other embodiments utilized in sports where helmets are not worn, or occasionally worn may also utilize at least one motion capture sensor on a cap or hat, for example on a baseball player's hat, along with at least one sensor mounted on a batting helmet. Headband mounts may also be utilized in sports where a cap is not utilized, such as soccer to also determine concussions. In one or more embodiments, the isolator utilized on a helmet may remain in the enclosure attached to the helmet and the sensor may be removed and placed on another piece of equipment that does not make use of an isolator that matches the dampening of a user's brain fluids. Embodiments may automatically detect a type of motion and determine the type of equipment that the motion capture sensor is currently attached to based on characteristic motion patterns associated with certain types of equipment, i.e., surfboard versus baseball bat.

Embodiments of the invention may be configured to obtain/calculate a linear acceleration value or a rotational acceleration value or both. This enables rotational events to be monitored for concussions as well as linear accelerations. Other events may make use of the linear and/or rotational acceleration and/or velocity, for example as compared against patterns or templates to not only switch sensor personalities during an event to alter the capture characteristics dynamically, but also to characterize the type of equipment currently being utilized with the current motion capture sensor. This enables a single motion capture element purchase by a user to instrument multiple pieces of equipment or clothing by enabling the sensor to automatically determine what type of equipment or piece of clothing the sensor is coupled to based on the motion captured by the sensor when compared against characteristic patterns or templates of motion.

Embodiments of the invention may transmit the event data associated with the event using a connectionless broadcast message. In one or more embodiments, depending on the wireless communication employed, broadcast messages may include payloads with a limited amount of data that may be utilized to avoid handshaking and overhead of a connection based protocol. In other embodiments connectionless or connection based protocols may be utilized in any combination.

In one or more embodiments, the computer may access previously stored event data or motion analysis data associated with the user or piece of equipment, for example to determine the number of concussions or falls or other swings, or any other motion event. Embodiments may also present event data associated with the at least one user on a display based on the event data or motion analysis data associated with the user or piece of equipment and the previously stored event data or motion analysis data associated with the user or piece of equipment or with at least one other user or other piece of equipment. This enables comparison of motion events, in number or quantitative value, e.g., the maximum rotational acceleration observed by the user or other users in a particular game or historically. In addition, patterns or templates that define characteristic motion of particular pieces of equipment for typical events may be dynamically updated, for example on a central server or locally, and dynamically updated in motion capture sensors via the wireless interface in one or more embodiments. This enables sensors to improve over time.

Embodiments of the invention may transmit the information to a display on a visual display coupled with the computer or a remote computer, for example over broadcast television or the Internet for example. Embodiments of the display may also be configured to accept sub-event time locations to provide discrete scrolling along the timeline of the whole event. For example a golf swing may include sub-events such as an address, swing back, swing forward, strike, follow through. The system may display time locations for the sub-events and accept user input near the location to assert that the video should start or stop at that point in time, or scroll to or back to that point in time for ease of viewing sub-events for example.

Embodiments of the invention may also include an identifier coupled with the at least one motion capture sensor or the user or the piece of equipment. In one or more embodiments, the identifier may include a team and jersey number or student identifier number or license number or any other identifier that enables relatively unique identification of a particular event from a particular user or piece of equipment. This enables team sports or locations with multiple players or users to be identified with respect to the app that is configured to receive data associated with a particular player or user. One or more embodiments receive the identifier, for example a passive RFID identifier or MAC address or other serial number associated with the player or user and associate the identifier with the event data and motion analysis data.

One or more embodiments of the at least one motion capture element may further include a light emitting element configured to output light if the event occurs. This may be utilized to display a potential, mild or severe level of concussion on the outer portion of the helmet without any required communication to any external device for example. Different colors or flashing intervals may also be utilized to relay information related to the event. Alternatively, or in combination, the at least one motion capture element may further include an audio output element configured to output sound if the event occurs or if the at least one motion capture sensor is out of range of the computer or wherein the computer is configured to display and alert if the at least one motion capture sensor is out of range of the computer, or any combination thereof. Embodiments of the sensor may also utilize an LCD that outputs a coded analysis of the current event, for example in a Quick Response (QR) code or bar code for example so that a referee may obtain a snapshot of the analysis code on a mobile device locally, and so that the event is not viewed in a readable form on the sensor or wirelessly transmitted and intercepted by anyone else.

In one or more embodiments, the at least one motion capture element further includes a location determination element coupled with the microcontroller. This may include a GPS device for example. Alternatively, or in combination, the computer may triangulate the location in concert with another computer, or obtain the location from any other triangulation type of receiver, or calculate the location based on images captured via a camera coupled with the computer and known to be oriented in a particular direction, wherein the computer calculates an offset from the mobile device based on the direction and size of objects within the image for example.

In one or more embodiments, the computer is further configured to request at least one image or video that contains the event from at least one camera proximal to the event. This may include a broadcast message requesting video from a particular proximal camera or a camera that is pointing in the direction of the event. In one or more embodiments, the computer is further configured to broadcast a request for camera locations proximal to the event or oriented to view the event, and optionally display the available cameras, or videos therefrom for the time duration around the event of interest. In one or more embodiments, the computer is further configured to display a list of one or more times at which the event has occurred, which enables the user obtain the desired event video via the computer, and/or to independently request the video from a third party with the desired event times.

In one or more embodiments, the at least one motion capture sensor is coupled with the mobile device and for example uses an internal motion sensor within or coupled with the mobile device. This enables motion capture and event recognition with minimal and ubiquitous hardware, e.g., using a mobile device with a built-in accelerometer. In one or more embodiments, a first mobile device may be coupled with a user recording motion data, while a second mobile device is utilized to record a video of the motion. In one or more embodiments, the user undergoing motion may gesture, e.g., tap N times on the mobile device to indicate that the second user's mobile device should start recording video or stop recording video. Any other gesture may be utilized to communicate event related or motion related indications between mobile devices.

Embodiments of the at least one motion capture sensor may include a temperature sensor, or the microcontroller may otherwise be coupled with a temperature sensor. In these embodiments, the microcontroller is configured to transmit a temperature obtained from the temperature sensor as a temperature event, for example as a potential indication of heat stroke or hypothermia.

Thus embodiments of the invention may recognize any type of motion event, including events related to motion that is indicative of standing, walking, falling, a heat stroke, seizure, violent shaking, a concussion, a collision, abnormal gait, abnormal or non-existent breathing or any combination thereof or any other type of event having a duration of time during with motion occurs.

Embodiments of the invention may utilize data mining on the motion capture data to obtain patterns for users, equipment, or use the motion capture data or events of a given user or other user in particular embodiments of the invention. Data mining relates to discovering new patterns in large databases wherein the patterns are previously unknown. Many methods may be applied to the data to discover new patterns including statistical analysis, neural networks and artificial intelligence for example. Due to the large amount of data, automated data mining may be performed by one or more computers to find unknown patterns in the data. Unknown patterns may include groups of related data, anomalies in the data, dependencies between elements of the data, classifications and functions that model the data with minimal error or any other type of unknown pattern. Displays of data mining results may include displays that summarize newly discovered patterns in a way that is easier for a user to understand than large amounts of pure raw data. One of the results of the data mining process is improved market research reports, product improvement, lead generation and targeted sales. Generally, any type of data that will be subjected to data mining must be cleansed, data mined and the results of which are generally validated. Businesses may increase profits using data mining. Examples of benefits of embodiments of the invention include customer relationship management to highly target individuals based on patterns discovered in the data. In addition, market basket analysis data mining enables identifying products that are purchased or owned by the same individuals and which can be utilized to offer products to users that own one product but who do not own another product that is typically owned by other users.

Other areas of data mining include analyzing large sets of motion data from different users to suggest exercises to improve performance based on performance data from other users. For example if one user has less rotation of the hips during a swing versus the average user, then exercises to improve flexibility or strength may be suggested by the system. In a golf course embodiment, golf course planners may determine over a large amount of users on a golf course which holes should be adjusted in length or difficulty to obtain more discrete values for the average number of shots per hole, or for determining the amount of time between golfers, for example at a certain time of day or for golfers of a certain age. In addition, sports and medical applications of data mining include determining morphological changes in user performance over time, for example versus diet or exercise changes to determine what improves performance the most, or for example what times of the day, temperatures, or other conditions produce swing events that result in the furthest drive or lowest score. Use of motion capture data for a particular user or with respect to other users enables healthcare compliance, for example to ensure a person with diabetes moves a certain amount during the day, and morphological analysis to determine how a user's motion or range of motion has changed over time. Games may be played with motion capture data that enables virtual reality play against historical greats or other users. For example, a person may play against a previous performance of the same person or against the motion capture data of a friend. This allows users to play a game in a historic stadium or venue in a virtual reality environment, but with motion capture data acquired from the user or other users previously for example. Military planners may utilize the motion capture data to determine which soldiers are most fit and therefore eligible for special operations, or which ones should retire, or by coaches to determine when a player should rest based on the concussion events and severity thereof sustained by a player for example and potentially based on a mined time period where other users have increased performance after a concussion related event.

Embodiments of the system perform motion capture and/or display with an application for example that executes on mobile device that may include a visual display and an optional camera and which is capable of obtaining data from at least one motion capture element such as a visual marker and/or a wireless sensor. The system can also integrate with standalone cameras, or cameras on multiple mobile devices. The system also enables the user to analyze and display the motion capture data in a variety of ways that provide immediate easy to understand graphical information associated with the motion capture data. Motion capture elements utilized in the system intelligently store data for example related to events associated with striking a ball, making a ski turn, jumping, etc., and eliminate false events, and greatly improve memory usage and minimize storage requirements. In addition, the data may be stored for example for more than one event associated with the sporting equipment, for example multiple bat swings or for an entire round of golf or more if necessary at least until the data is downloaded to a mobile device or to the Internet. Data compression of captured data may also be utilized to store more motion capture data in a given amount of memory. Motion capture elements utilized in the system may also be configured to intelligently power down portions of their circuitry to save power, for example power down transceivers until motion is detected of a certain type. Embodiments of the invention may also utilize flexible battery connectors to couple two or more batteries in parallel to increase the time the system may be utilized before replacing the batteries. Motion capture data is generally stored in memory such as a local database or in a network accessible database, any of which enables data mining described above. Any other type of data mining may be performed using embodiments of the invention, including searching for temporal changes of data related to one or more users and or simply searching for data related to a particular user or piece of equipment.

Other embodiments may displaying information such as music selections or music playlists to be played based on the motion related data. This for example enables a performance to be compared to another user's performance and select the type of music the other user plays, or to compare the performance relative to a threshold that determines what type of music selection to suggest or display.

Embodiments of the invention directed sports for example enable RFID or passive RFID tags to be placed on items that a user moves wherein embodiments of the system keep track of the motion. For example, by placing passive RFID tags on a particular helmet or cap, or protective mouthpiece for boxing, football, soccer or other contact sport, particular dumbbells at a gym, and by wearing motion capture elements such as gloves and with a pre-existing mobile device for example an IPHONE®, embodiments of the invention provide automatic safety compliance or fitness and/or healthcare compliance. This is achieved by keeping track of the motion, and via RIFD or passive RFID, the weight that the user is lifting. Embodiments of the invention may thus add the number of repetitions multiplied by the amount of weight indicated by each RFID tag to calculate the number of calories burned by the user. In another example, an RFID tag coupled with a stationary bike, or wherein the stationary bike can mimic the identifier and/or communicate wirelessly to provide performance data and wherein the mobile computer includes an RFID reader, the number of rotations of the user's legs may be counted. Any other use of RFID or passive RFID is in keeping with the spirit of the invention. This enables doctors to remotely determine whether a user has complied with their medical recommendations, or exceeded linear or rotational acceleration indicative of a concussion for example. Embodiments may thus be utilized by users to ensure compliance and by doctors to lower their malpractice insurance rates since they are ensuring that their patients are complying with their recommendations, albeit remotely. Embodiments of the invention do not require RFID tags for medical compliance, but may utilize them. Embodiments of the invention directed at golf also enable golf shots for each club associated with a golfer to be counted through use of an identifier such as RFID tags on each club (or optionally via an identifier associated with motion capture electronics on a golf club or obtained remotely over the radio) and a mobile computer, for example an IPHONE® equipped with an RFID reader that concentrates the processing for golf shot counting on the mobile computer instead of on each golf club. Embodiments of the invention may also allow for the measurement of orientation (North/South, and/or two horizontal axes and the vertical axis) and acceleration using an inertial measurement unit, or accelerometers and/or magnetometers, and/or gyroscopes. This is not required for golf shot counting, although one or more embodiments may determine when the golf club has struck a golf ball through vibration analysis for example and then query a golfer whether to count a shot or not. This functionality may be combined with speed or acceleration threshold or range detection for example to determine whether the golf club was travelling within an acceptable speed or range, or acceleration or range for the "hit" to count. Wavelets may also be utilized to compare valid swing signatures to eliminate count shots or eliminate false strikes for example. This range may vary between different clubs, for example a driver speed range may be "greater than 30 mph" while a putter speed range may be "less than 20 mph", any range may be utilized with any club as desired, or the speed range may be ignored for example. Alternatively or in combination, the mobile computer may only query the golfer to count a shot if the golfer is not moving laterally, i.e., in a golf cart or walking, and/or wherein the golfer may have rotated or taken a shot as determined by a orientation or gyroscope sensor coupled with the mobile computer. The position of the stroke may be shown on a map on the mobile computer for example. In addition, GPS receivers with wireless radios may be placed within the tee markers and in the cups to give daily updates of distances and helps with reading putts and greens for example. The golfer may also wear virtual glasses that allow the golfer to see the golf course map, current location, distance to the hole, number of shots on the current hole, total number of shots and any other desired metric. If the user moves a certain distance, as determined by GPS for example, from the shot without counting the shot, the system may prompt the user on whether to count the shot or not. The system does not require a user to initiate a switch on a club to count a shot and does not require LED's or active or battery powered electronics on each club to count shots. The mobile computer may also accept gestures from the user to count a shot or not count a shot so that the golfer does not have to remove any gloves to operate the mobile computer. For embodiments that utilize position/orientation sensors, the system may only count shots when a club is oriented vertically for example when an impact is detected. The apparatus may also include identifiers that enable a specific apparatus to be identified. The identifiers may be a serial number for example. The identifier for example may originate from an RFID tag on each golf club, or optionally may include a serial number or other identifier associated with motion capture elements associated with a golf club. Utilizing this apparatus enables the identification of a specific golfer, specific club and also enables motion capture and/or display with a system that includes a television and/or mobile device having a visual display and an optional camera and capable of obtaining data from at least one motion capture element such as a visual marker and/or a wireless sensor. The system can also integrate with standalone cameras, or cameras on multiple mobile devices. The system also enables the user to analyze and display the motion capture data in a variety of ways that provide immediate and easy to understand graphical information associated with the motion capture data. The apparatus enables the system to also determine how "centered" an impact is with respect to a ball and a piece of equipment, such as a golf club for example. The system also allows for fitting of equipment including shoes, clubs, etc., and immediate purchasing of the equipment even if the equipment requires a custom assemble-to-order request from a vendor. Once the motion capture data, videos or images and shot count indications are obtained by the system, they may be stored locally, for example in a local database or sent over a telephonic or wireless interface to a remote database for example. Once in a database, the various elements including any data associated with the user, such as age, sex, height, weight, address, income or any other related information may be utilized in embodiments of the invention and/or subjected to data mining. One or more embodiments enable users or OEMs for example to pay for access to the data mining capabilities of the system.

For example, embodiments that utilize motion capture elements allow for analyzing the data obtained from the apparatus and enable the presentation of unique displays associated with the user, such as 3D overlays onto images of the body of the user to visually depict the captured motion data. In addition, these embodiments may also utilize active wireless technology such as BLUETOOTH® Low Energy for a range of up to 50 meters to communicate with a golfer's mobile computer. Embodiments of the invention also allow for display of queries for counting a stroke for example as a result of receiving a golf club ID, for example via an RFID reader or alternatively via wireless communication using BLUETOOTH® or IEEE 802.11 for example. Use of BLUETOOTH® Low Energy chips allows for a club to be in sleep mode for up to 3 years with a standard coin cell battery, thus reducing required maintenance. One or more embodiments of the invention may utilize more than one radio, of more than one technology for example. This allows for a level of redundancy that increases robustness of the system. For example, if one radio no longer functions, e.g., the BLUETOOTH® radio for example, then the IEEE 802.11 radio may be utilized to transfer data and warn the golfer that one of the radios is not functioning, while still allowing the golfer to record motion data and count shots associated with the particular club. For embodiments of the invention that utilize a mobile device (or more than one mobile device) without camera(s), sensor data may be utilized to generate displays of the captured motion data, while the mobile device may optionally obtain images from other cameras or other mobile devices with cameras. For example, display types that may or may not utilize images of the user may include ratings, calculated data and time line data. Ratings associated with the captured motion can also be displayed to the user in the form of numerical or graphical data with or without a user image, for example an "efficiency" rating. Other ratings may include linear acceleration and/or rotational acceleration values for the determination of concussions and other events for example. Calculated data, such as a predicted ball flight path data can be calculated and displayed on the mobile device with or without utilizing images of the user's body. Data depicted on a time line can also be displayed with or without images of the user to show the relative peaks of velocity for various parts of the equipment or user's body for example. Images from multiple cameras including multiple mobile devices, for example from a crowd of golf fans, may be combined into a BULLET TIME® visual effect characterized by slow motion of the golf swing shown from around the golfer at various angles at normal speed. All analyzed data may be displayed locally, or uploaded to the database along with the motion capture data, images/videos, shot count and location data where it may undergo data mining processes, wherein the system may charge a fee for access to the results for example.

In one or more embodiments, a user may play a golf course or hit tennis balls, or alternatively simply swing to generate motion capture data for example and when wearing virtual reality glasses, see an avatar of another user, whether virtual or real in an augmented reality environment. In other embodiments, the user moves a piece of equipment associated with any sport or simply move the user's own body coupled with motion capture sensors and view a virtual reality environment displayed in virtual reality glasses of the user's movement or movement of a piece of equipment so instrumented. Alternatively or in combination, a virtual reality room or other environment may be utilized to project the virtual reality avatars and motion data. Hence, embodiments of the system may allow a user on a real golf course to play along with another user at a different location that is not actually hitting balls along with a historical player whose motion data has been analyzed or a data mining constructed user based on one or more motion capture data sequences, and utilized by an embodiment of the system to project an avatar of the historical player. Each of the three players may play in turn, as if they were located in the same place.

Motion capture data and/or events can be displayed in many ways, for example tweeted, to a social network during or after motion capture. For example, if a certain amount of exercise or motion is performed, or calories performed, or a new sports power factor maximum has been obtained, the system can automatically tweet the new information to a social network site so that anyone connected to the Internet may be notified. The data uploaded to the Internet, i.e., a remote database or remote server or memory remote to the system may be viewed, analyzed or data mined by any computer that may obtain access to the data. This allows for remote compliance tweeting and/or compliance and/or original equipment manufacturers to determine for a given user what equipment for compliance or sporting equipment for sports related embodiments is working best and/or what equipment to suggest. Data mining also enables suggestions for users to improve their compliance and/or the planning of sports venues, including golf courses based on the data and/or metadata associated with users, such as age, or any other demographics that may be entered into the system. Remote storage of data also enables medical applications such as morphological analysis, range of motion over time, and diabetes prevention and exercise monitoring and compliance applications as stated. Other applications also allow for games that use real motion capture data from other users, or historical players whether alive or dead after analyzing videos of the historical players for example. Virtual reality and augmented virtual reality applications may also utilize the motion capture data or historical motion data. Military personnel such as commanders and/or doctors may utilize the motion and/or images in determine what type of G-forces a person has undergone from an explosion near an Improvised Explosive Device and automatically route the best type of medical aid automatically to the location of the motion capture sensor. One or more embodiments of the system may relay motion capture data over a G-force or velocity threshold, to their commanding officer or nearest medical personnel for example via a wireless communication link. Alternatively, embodiments of the invention may broadcast lightweight connectionless concussion related messages to any mobile devices listening, e.g., a referee's mobile phone to aid in the assistance of the injured player wherein the lightweight message includes an optional team/jersey number and an acceleration related number such as a potential/probable concussion warning or indicator.

In one or more embodiments of the invention, fixed cameras such as at a tennis tournament, football game, baseball game, car or motorcycle race, golf tournament or other sporting event can be utilized with a wireless interface located near the player/equipment having motion capture elements so as to obtain, analyze and display motion capture data. In this embodiment, real-time or near real-time motion data can be displayed on the video for augmented video replays. An increase in the entertainment level is thus created by visually displaying how fast equipment is moving during a shot, for example with rings drawn around a players hips and shoulders. Embodiments of the invention also allow images or videos from other players having mobile devices to be utilized on a mobile device related to another user so that users don't have to switch mobile phones for example. In one embodiment, a video obtained by a first user for a piece of sporting equipment in motion that is not associated with the second user having the video camera equipped mobile phone may automatically transfer the video to the first user for display with motion capture data associated with the first user. Video and images may be uploaded into the database and data mined through image analysis to determine the types/colors of clothing or shoes for example that users are wearing.

Based on the display of data, the user can determine the equipment that fits the best and immediately purchase the equipment, via the mobile device. For example, when deciding between two sets of skis, a user may try out both pairs that are instrumented with motion capture elements wherein the motion capture data is analyzed to determine which pair of skis enables more efficient movement. For golf embodiments, when deciding between two golf clubs, a user can take swings with different clubs and based on the analysis of the captured motion data and quantitatively determine which club performs better. Custom equipment may be ordered through an interface on the mobile device from a vendor that can assemble-to-order customer built equipment and ship the equipment to the user for example. Shaft lengths for putters for example that are a standard length can be custom made for a particular user based on captured motion data as a user putts with an adjustable length shaft for example. Based on data mining of the motion capture data and shot count data and distances for example allows for users having similar swing characteristics to be compared against a current user wherein equipment that delivers longer shots for a given swing velocity for a user of a particular size and age for example may be suggested or searched for by the user to improve performance. OEMs may determine that for given swing speeds, which make and model of club delivers the best overall performance as well. One skilled in the art will recognize that this applies to all activities involving motion, not just golf.

Embodiments of the system may utilize a variety of sensor types. In one or more embodiments of the invention, active sensors may integrate with a system that permits passive or active visual markers to be utilized to capture motion of particular points on a user's body or equipment. This may be performed in a simply two-dimensional manner or in a three-dimensional manner if the mobile device is configured with two or more cameras, or if multiple cameras or mobile devices are utilized to capture images such as video and share the images in order to create triangulated three-dimensional motion data from a set of two-dimensional images obtained from each camera. Another embodiment of the invention may utilize inertial measurement units (IMU) or any other sensors that can produce any combination of orientation, position, velocity and/or acceleration information to the mobile device. The sensors may thus obtain data that may include any combination of one or more values associated with orientation (vertical or North/South or both), position (either via through Global Positioning System, i.e., "GPS" or through triangulation), velocity (in all three axes), acceleration (in all three axes). All motion capture data obtained from the various sensor types may be saved in a database for analysis, monitoring, compliance, game playing or other use and/or data mining, regardless of the sensor type.

In one or more embodiments of the invention, a sensor may be utilized that includes a passive marker or active marker on an outside surface of the sensor, so that the sensor may also be utilized for visual tracking (either two-dimensional or three-dimensional) and for orientation, position, velocity, acceleration or any other physical quantity produced by the sensor. Visual marker embodiments of the motion capture element(s) may be passive or active, meaning that they may either have a visual portion that is visually trackable or may include a light emitting element such as a light emitting diode (LED) that allows for image tracking in low light conditions. This for example may be implemented with a graphical symbol or colored marker at the end of the shaft near the handle or at the opposing end of the golf club at the head of the club. Images or videos of the markers may be analyzed locally or saved in the database and analyzed and then utilized in data mining. In addition, for concussion related embodiments, the visual marker may emit a light that is indicative of a concussion, for example flashing yellow for a moderate concussion and fast flashing red for a sever concussion or any other visual or optional audio event indicators or both. As previously discussed, an LCD may output a local visual encoded message so that it is not intercepted or otherwise readable by anyone not having a mobile device local and equipped to read the code. This enables sensitive medical messages to only be read by a referee or local medical personnel for a concussion or paralysis related event for example.

Embodiments of the motion capture sensors may be generally mounted on or near one or more end or opposing ends of sporting equipment, for example such as a golf club and/or anywhere in between (for EI measurements) and may integrate with other sensors coupled to equipment, such as weapons, medical equipment, wristbands, shoes, pants, shirts, gloves, clubs, bats, racquets, balls, helmets, caps, mouthpieces, etc., and/or may be attached to a user in any possible manner. For example, a rifle to determine where the rifle was pointing when a recoil was detected by the motion capture sensor. This data may be transmitted to a central server, for example using a mobile computer such as a mobile phone or other device and analyzed for war games practice for example. In addition, one or more embodiments of the sensor can fit into a weight port of a golf club, and/or in the handle end of the golf club. Other embodiments may fit into the handle of, or end of, a tennis racquet or baseball bat for example. Embodiments that are related to safety or health monitoring may be coupled with a cap, helmet, and/or mouthpiece or in any other type of enclosure. One or more embodiments of the invention may also operate with balls that have integrated sensors as well. One or more embodiments of the mobile device may include a small mountable computer such as an IPOD® SHUFFLE® or IPOD® NANO® that may or may not have integrated displays, and which are small enough to mount on a shaft of a piece of sporting equipment and not affect a user's swing. Alternatively, the system may calculate the virtual flight path of a ball that has come in contact with equipment moved by a player. For example with a baseball bat or tennis racquet or golf club having a sensor integrated into a weight port of other portion of the end of the club striking the golf ball and having a second sensor located in the tip of the handle of the golf club, or in one or more gloves worn by the player, an angle of impact can be calculated for the club. By knowing the loft of the face of the club, an angle of flight may be calculated for the golf ball. In addition, by sampling the sensor at the end of the club at a high enough speed to determine oscillations indicative of where on the face of the club the golf ball was struck, a quality of impact may be determined. These types of measurements and the analysis thereof help an athlete improve, and for fitting purposes, allow an athlete to immediately purchase equipment that fits correctly. Centering data may be uploaded to the database and data mined for patterns related to the bats, racquets or clubs with the best centering on average, or the lowest torsion values for example on a manufacturer basis for product improvement. Any other unknown patterns in the data that are discovered may also be presented or suggested to users or search on by users, or paid for, for example by manufacturers or users.

One or more embodiments of the sensor may contain charging features such as mechanical eccentric weight, as utilized in some watches known as "automatic" or "self-winding" watches, optionally including a small generator, or inductive charging coils for indirect electromechanical charging of the sensor power supply. Other embodiments may utilize plugs for direct charging of the sensor power supply or electromechanical or microelectromechanical (MEMS) based charging elements. Any other type of power microharvesting technologies may be utilized in one or more embodiments of the invention. One or more embodiments of the sensor may utilize power saving features including gestures that power the sensor on or off. Such gestures may include motion, physical switches, contact with the sensor, wireless commands to the sensor, for example from a mobile device that is associated with the particular sensors. Other elements that may couple with the sensor includes a battery, low power microcontroller, antenna and radio, heat sync, recharger and overcharge sensor for example. In addition, embodiments of the invention allow for power down of some or all of the components of the system until an electronic signal from accelerometers or a mechanical switch determines that the club has moved for example.

One or more embodiments of the invention enable Elasticity Inertia or EI measurement of sporting equipment and even body parts for example. Placement of embodiments of the sensor along the shaft of a golf club, tennis racquet, baseball bat, hockey stick, shoe, human arm or any other item that is not perfectly stiff enables measurement of the amount of flex at points where sensors are located or between sensors. The angular differences in the each sensor over time allow for not only calculation of a flex profile, but also a flex profile that is dependent on time or force. For example, known EI machines use static weights between to support points to determine an EI profile. These machines therefore cannot detect whether the EI profile is dependent upon the force applied or is dependent on the time at which the force is applied, for example EI profiles may be non-linear with respect to force or time. Example materials that are known to have different physical properties with respect to time include Maxwell materials and non-Newtonian fluids.

A user may also view the captured motion data in a graphical form on the display of the mobile device or for example on a set of glasses that contains a video display. The captured motion data obtained from embodiments of the motion capture element may also be utilized to augment a virtual reality display of user in a virtual environment. Virtual reality or augmented reality views of patterns that are found in the database via data mining are also in keeping with the spirit of the invention. User's may also see augmented information such as an aim assist or aim guide that shows for example where a shot should be attempted to be placed for example based on existing wind conditions, or to account for hazards, e.g., trees that are in the way of a desired destination for a ball, i.e., the golf hole for example.

BRIEF DESCRIPTION OF THE DRAWINGS

The above and other aspects, features and advantages of the ideas conveyed through this disclosure will be more apparent from the following more particular description thereof, presented in conjunction with the following drawings wherein:

FIG. 1 illustrates an embodiment of the motion event recognition system.

FIG. 1A illustrates a logical hardware block diagram of an embodiment of the computer.

FIG. 1B illustrates an architectural view of an embodiment of the database utilized in embodiments of the system.

FIG. 2A illustrates a helmet based mount that surrounds the head of a user wherein the helmet based mount holds a motion capture sensor. FIG. 2B illustrates a neck insert based mount that enables retrofitting existing helmets with a motion capture sensor.

FIG. 4A illustrates a top cross sectional view of the helmet, padding, cranium, and brain of a user. FIG. 4B illustrates a rotational concussion event for the various elements shown in FIG. 4.

FIG. 14 illustrates an embodiment of the motion capture element configured with optional LED visual indicator for local display and viewing of event related information and an optional LCD configured to display a text or encoded message associated with the event.

FIG. 17 illustrates an embodiment of the algorithm utilized by any computer in FIG. 1 that is configured to display motion images and motion capture data in a combined format.

DETAILED DESCRIPTION OF THE INVENTION

Figure 1C:
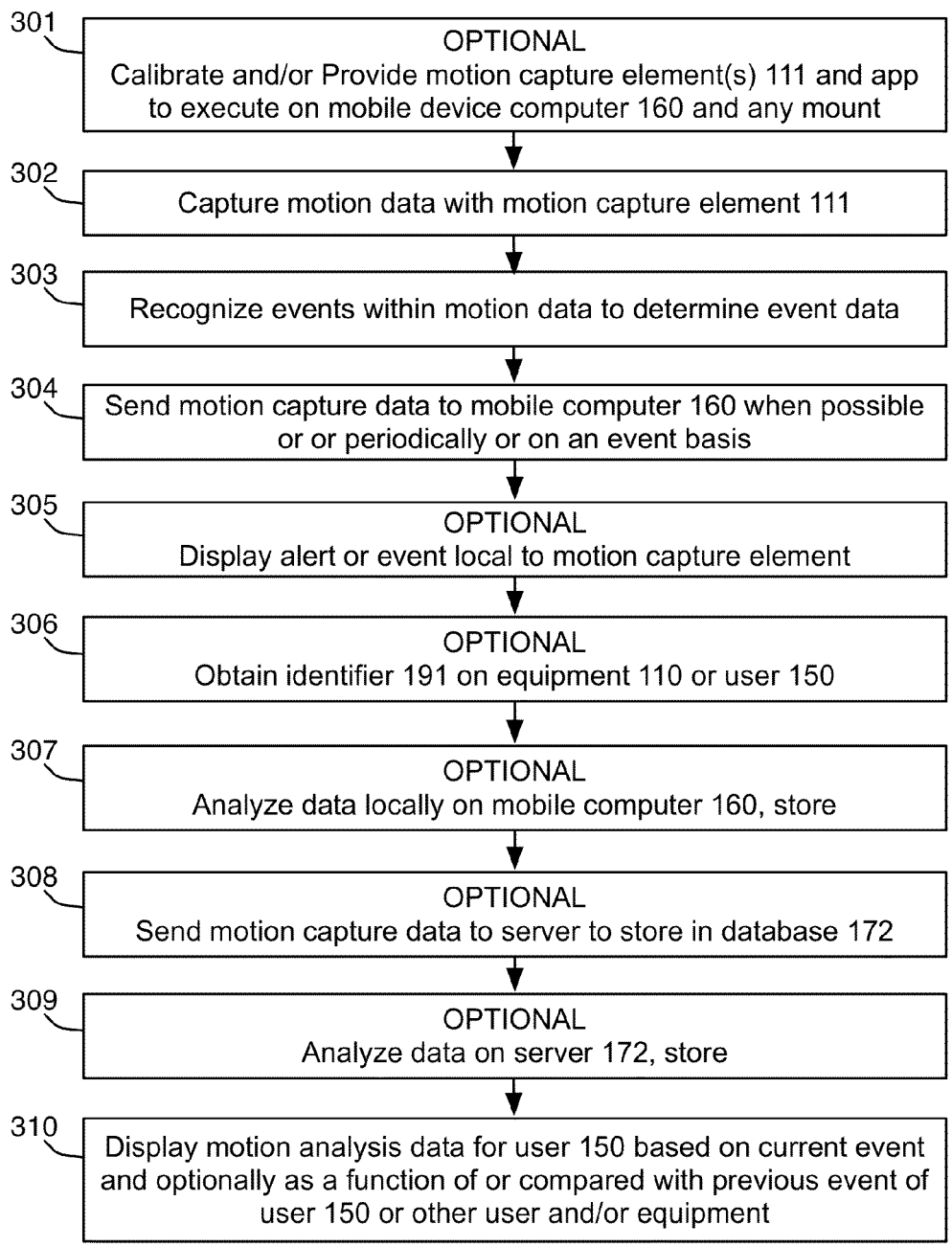
FIG. 1C illustrates a flow chart for an embodiment of the processing performed by embodiments of the computers in the system as shown in FIGS. 1 and 1A.

A motion event recognition system and method will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

FIG. 1 illustrates an embodiment of the motion event recognition system 100. Embodiments enable event based viewing and low power transmission of events and communication with an app executing on a mobile device and/or with external cameras to designate windows that define the events. Enables recognition of motion events, and designation of events within images or videos, such as a shot, move or swing of a player, a concussion of a player, boxer, rider or driver, or a heat stroke, hypothermia, seizure, asthma attack, epileptic attack or any other sporting or physical motion related event including walking and falling. Events may be correlated with one or more images or video as captured from internal/external camera or cameras or nanny cam, for example to enable saving video of the event, such as the first steps of a child, violent shaking events, sporting events including concussions, or falling events associated with an elderly person. As shown, embodiments of the system generally include a mobile device 101 and applications that execute thereon, that includes computer 160, shown as located internally in mobile device 101 as a dotted outline, (i.e., also see functional view of computer 160 in FIG. 1A), display 120 coupled to computer 160 and a wireless communications interface (generally internal to the mobile device, see element 164 in FIG. 1A) coupled with the computer. Since mobile phones having mobile computers are ubiquitous, users of the system may purchase one or more motion capture elements and an application, a.k.a., "app", that they install on their pre-existing phone to implement an embodiment of the system. Motion capture capabilities are thus available at an affordable price for any user that already owns a mobile phone, tablet computer, music player, etc., which has never been possible before.

Each mobile device 101, 102, 102a, 102b may optionally include an internal identifier reader 190, for example an RFID reader, or may couple with an identifier reader or RFID reader (see mobile device 102) to obtain identifier 191. Alternatively, embodiments of the invention may utilize any wireless technology in any of the devices to communicate an identifier that identifies equipment 110 to the system. Embodiments of the invention may also include any other type of identifier coupled with the at least one motion capture sensor or the user or the piece of equipment. In one or more embodiments, the identifier may include a team and jersey number or student identifier number or license number or any other identifier that enables relatively unique identification of a particular event from a particular user or piece of equipment. This enables team sports or locations with multiple players or users to be identified with respect to the app that is configured to receive data associated with a particular player or user. One or more embodiments receive the identifier, for example a passive RFID identifier or MAC address or other serial number associated with the player or user and associate the identifier with the event data and motion analysis data.

The system generally includes at least one motion capture element 111 that couples with user 150 or with piece of equipment 110, via mount 192, for example to a golf club, or baseball bat, tennis racquet, hockey stick, weapon, stick, sword, or any other piece of equipment for any sport, or other sporting equipment such as a shoe, belt, gloves, glasses, hat, or any other item. The at least one motion capture element 111 may be placed at one end, both ends, or anywhere between both ends of piece of equipment 110 or anywhere on user 150, e.g., on a cap, headband, helmet, mouthpiece or any combination thereof, and may also be utilized for EI measurements of any item. The motion capture element may optionally include a visual marker, either passive or active, and/or may include a wireless sensor, for example any sensor capable of providing any combination of one or more values associated with an orientation (North/South and/or up/down), position, velocity and/or acceleration of the motion capture element. The computer may be configured to obtain data associated with an identifier unique to each piece of equipment 110, e.g., clothing, bat, etc., for example from an RFID coupled with club 110, i.e., identifier 191, and optionally associated with the at least one motion capture element, either visually or wirelessly, analyze the data to form motion analysis data and display the motion analysis data on display 120 of mobile device 101. Motion capture element 111 may be mounted on or near the equipment or on or near the user via motion capture mount 192. Motion capture element 111 mounted on a helmet for example may include an isolator comprising a material that is configured to surround the motion capture element to approximate physical acceleration dampening of cerebrospinal fluid around the user's brain to minimize translation of linear acceleration and rotational acceleration of event data to obtain an observed linear acceleration and an observed rotational acceleration of the user's brain. This lowers processing requirements on the motion capture element microcontroller for example and enables low memory utilization and lower power requirements for event based transmission of event data. The motion capture data from motion capture element 111, any data associated with the piece of equipment 110, such as identifier 191 and any data associated with user 150, or any number of such users 150, such as second user 152 may be stored in locally in memory, or in a database local to the computer or in a remote database, for example database 172. Data may be stored in database 172 from each user 150, 152 for example when a network or telephonic network link is available from motion capture element 111 to mobile device 101 and from mobile device 101 to network 170 or Internet 171 and to database 172. Data mining is then performed on a large data set associated with any number of users and their specific characteristics and performance parameters. For example, in a golf embodiment of the invention, a club ID is obtained from the golf club and a shot is detected by the motion capture element. Mobile computer 101 stores images/video of the user and receives the motion capture data for the events/hits/shots/motion and the location of the event on the course and subsequent shots and determines any parameters for each event, such as distance or speed at the time of the vent and then performs any local analysis and display performance data on the mobile device. When a network connection from the mobile device to network 170 or Internet 171 is available or for example after a round of golf, the images/video, motion capture data and performance data is uploaded to database 172, for later analysis and/or display and/or data mining. In one or more embodiments, users 151, such as original equipment manufacturers pay for access to the database, for example via a computer such as computer 105 or mobile computer 101 or from any other computer capable of communicating with database 172 for example via network 170, Internet 171 or via website 173 or a server that forms part of or is coupled with database 172. Data mining may execute on database 172, for example that may include a local server computer, or may be run on computer 105 or mobile device 101, 102, 102a or 102b and access a standalone embodiment of database 172 for example. Data mining results may be displayed on mobile device 101, computer 105, television broadcast or web video originating from camera 130, 130a and 103b, or 104 or accessed via website 173 or any combination thereof.

One or more embodiments of the at least one motion capture element may further include a light emitting element configured to output light if the event occurs. This may be utilized to display a potential, mild or severe level of concussion on the outer portion of the helmet without any required communication to any external device for example. Different colors or flashing intervals may also be utilized to relay information related to the event. Alternatively, or in combination, the at least one motion capture element may further include an audio output element configured to output sound if the event occurs or if the at least one motion capture sensor is out of range of the computer or wherein the computer is configured to display and alert if the at least one motion capture sensor is out of range of the computer, or any combination thereof. Embodiments of the sensor may also utilize an LCD that outputs a coded analysis of the current event, for example in a Quick Response (QR) code or bar code for example so that a referee may obtain a snapshot of the analysis code on a mobile device locally, and so that the event is not viewed in a readable form on the sensor or wirelessly transmitted and intercepted by anyone else.

One or more embodiments of the system may utilize a mobile device that includes at least one camera 130, for example coupled to the computer within the mobile device. This allows for the computer within mobile device 101 to command the camera 130 to obtain an image or images, for example of the user during an athletic movement. The image(s) of the user may be overlaid with displays and ratings to make the motion analysis data more understandable to a human for example. Alternatively, detailed data displays without images of the user may also be displayed on display 120 or for example on the display of computer 105. In this manner two-dimensional images and subsequent display thereof is enabled. If mobile device 101 contains two cameras, as shown in mobile device 102, i.e., cameras 130a and 130b, then the cameras may be utilized to create a three-dimensional data set through image analysis of the visual markers for example. This allows for distances and positions of visual markers to be ascertained and analyzed. Images and/or video from any camera in any embodiments of the invention may be stored on database 172, for example associated with user 150, for data mining purposes. In one or more embodiments of the invention image analysis on the images and/or video may be performed to determine make/models of equipment, clothes, shoes, etc., that is utilized, for example per age of user 150 or time of day of play, or to discover any other pattern in the data.

Alternatively, for embodiments of mobile devices that have only one camera, multiple mobile devices may be utilized to obtain two-dimensional data in the form of images that is triangulated to determine the positions of visual markers. In one or more embodiments of the system, mobile device 101 and mobile device 102a share image data of user 150 to create three-dimensional motion analysis data. By determining the positions of mobile devices 101 and 102 (via position determination elements such as GPS chips in the devices as is common, or via cell tower triangulation and which are not shown for brevity but are generally located internally in mobile devices just as computer 160 is), and by obtaining data from motion capture element 111 for example locations of pixels in the images where the visual markers are in each image, distances and hence speeds are readily obtained as one skilled in the art will recognize.

Camera 103 may also be utilized either for still images or as is now common, for video. In embodiments of the system that utilize external cameras, any method of obtaining data from the external camera is in keeping with the spirit of the system including wireless communication of the data, or via wired communication as when camera 103 is docked with computer 105 for example, which then may transfer the data to mobile device 101.

In one or more embodiments of the system, the mobile device on which the motion analysis data is displayed is not required to have a camera, i.e., mobile device 102b may display data even though it is not configured with a camera. As such, mobile device 102b may obtain images from any combination of cameras on mobile device 101, 102, 102a, camera 103 and/or television camera 104 so long as any external camera may communicate images to mobile device 102b. Alternatively, no camera is required at all to utilize the system. See also FIG. 17.

For television broadcasts, motion capture element 111 wirelessly transmits data that is received by antenna 106. The wireless sensor data thus obtained from motion capture element 111 is combined with the images obtained from television camera 104 to produce displays with augmented motion analysis data that can be broadcast to televisions, computers such as computer 105, mobile devices 101, 102, 102*a*, 102*b* or any other device configured to display images. The motion analysis data can be positioned on display 120 for example by knowing the location of a camera (for example via GPS information), and by knowing the direction and/or orientation that the camera is pointing so long as the sensor data includes location data (for example GPS information). In other embodiments, visual markers or image processing may be utilized to lock the motion analysis data to the image, e.g., the golf club head can be tracked in the images and the corresponding high, middle and low position of the club can be utilized to determine the orientation of user 150 to camera 130 or 104 or 103 for example to correctly plot the augmented data onto the image of user 150. By time stamping images and time stamping motion capture data, for example after synchronizing the timer in the microcontroller with the timer on the mobile device and then scanning the images for visual markers or sporting equipment at various positions, simplified motion capture data may be overlaid onto the images. Any other method of combining images from a camera and motion capture data may be utilized in one or more embodiments of the invention. Any other algorithm for properly positioning the motion analysis data on display 120 with respect to a user (or any other display such as on computer 105) may be utilized in keeping with the spirit of the system. For example, when obtaining events or groups of events via the sensor, after the app receives the events and/or time ranges to obtain images, the app may request image data from that time span from it's local memory, any other mobile device, any other type of camera that may be communicated with and/or post event locations/times so that external camera systems local to the event(s) may provide image data for the times of the event(s).

One such display that may be generated and displayed on mobile device 101 include a BULLET TIME® view using two or more cameras selected from mobile devices 101, 102, 102*a*, camera 103, and/or television camera 104 or any other external camera. In this embodiment of the system, the computer is configured to obtain two or more images of user 150 and data associated with the at least one motion capture element (whether a visual marker or wireless sensor), wherein the two or more images are obtained from two or more cameras and wherein the computer is configured to generate a display that shows slow motion of user 150 shown from around the user at various angles at normal speed. Such an embodiment for example allows a group of fans to create their own BULLET TIME® shot of a golf pro at a tournament for example. The shots may be sent to computer 105 and any image processing required may be performed on computer 105 and broadcast to a television audience for example. In other embodiments of the system, the users of the various mobile devices share their own set of images, and or upload their shots to a website for later viewing for example. Embodiments of the invention also allow images or videos from other players having mobile devices to be utilized on a mobile device related to another user so that users don't have to switch mobile phones for example. In one embodiment, a video obtained by a first user for a piece of equipment in motion that is not associated with the second user having the video camera mobile phone may automatically transfer the video to the first user for display with motion capture data associated with the first user. Alternatively, the first user's mobile phone may be utilized as a motion sensor in place of or in addition to motion capture element 111 and the second user's mobile phone may be utilized to capture video of the first user while in motion. The first user may optionally gesture on the phone, tap/shake, etc., to indicate that the second mobile phone should start/stop motion capture for example.

FIG. 1A shows an embodiment of computer 160. In computer 160 includes processor 161 that executes software modules, commonly also known as applications, generally stored as computer program instructions within main memory 162. Display interface 163 drives display 120 of mobile device 101 as shown in FIG. 1. Optional orientation/position module 167 may include a North/South or up/down orientation chip or both. In one or more embodiments, the orientation/position module may include a location determination element coupled with the microcontroller. This may include a GPS device for example. Alternatively, or in combination, the computer may triangulate the location in concert with another computer, or obtain the location from any other triangulation type of receiver, or calculate the location based on images captured via a camera coupled with the computer and known to be oriented in a particular direction, wherein the computer calculates an offset from the mobile device based on the direction and size of objects within the image for example. Optional temperature sensor may coupled with processor 161 via a wired or wireless link and may be utilized for example as an indicator of hypothermia or heat stroke alone or in combination with any motion detected that may be indicative of shaking or unconsciousness for example. Communication interface 164 may include wireless or wired communications hardware protocol chips and/or an RFID reader or an RFID reader may couple to computer 160 externally or in any other manner for example. In one or more embodiments of the system communication interface may include telephonic and/or data communications hardware. In one or more embodiments communication interface 164 may include a Wi-Fi™ or other IEEE 802.11 device and/or BLUETOOTH® wireless communications interface or ZigBee® wireless device or any other wireless technology. BLUETOOTH® class 1 devices have a range of approximately 100 meters, class 2 devices have a range of approximately 10 meters. BLUETOOTH® Low Power devices have a range of approximately 50 meters. Any wireless network protocol or type may be utilized in embodiments of the system so long as mobile device 101 and motion capture element 111 can communicate with one another. Processor 161, main memory 162, display interface 163, communication interface 164 and orientation/position module 167 may communicate with one another over communication infrastructure 165, which is commonly known as a "bus". Communications path 166 may include wired or wireless medium that allows for communication with other wired or wireless devices over network 170. Network 170 may communicate with Internet 171 and/or database 172. Database 172 may be utilized to save or retrieve images or videos of users, or motion analysis data, or users displayed with motion analysis data in one form or another. The data uploaded to the Internet, i.e., a remote database or remote server or memory remote to the system may be viewed, analyzed or data mined by any computer that may obtain access to the data. This allows for original equipment manufacturers to determine for a given user what sporting equipment is working best and/or what equipment to suggest. Data mining also enables the planning of golf courses based on the data and/or metadata associated with users, such as age, or any other demographics that may be entered into the system. Remote storage of data also enables medical applications such as morphological analysis, range of motion over time, and diabetes prevention and exercise monitoring and compliance applications. Data mining based applications also allow for games that use real motion capture data from other users, one or more previous performances of the same user, or historical players whether alive or dead after analyzing motion pictures or videos of the historical players for example. Virtual reality and augmented virtual reality applications may also utilize the motion capture data or historical motion data. The system also enables uploading of performance related events and/or motion capture data to database 172, which for example may be implemented as a social networking site. This allows for the user to "tweet" high scores, or other metrics during or after play to notify everyone on the Internet of the new event. For example, one or more embodiments include at least one motion capture element 111 configured to couple with a user or piece of equipment or mobile device coupled with the user, wherein the at least one motion capture element includes a memory, a sensor configured to capture any combination of values associated with an orientation, position, velocity, acceleration of the at least one motion capture element, a radio, and a microcontroller coupled with the memory, the sensor and the radio. The microcontroller is configured to collect data that includes sensor values from the sensor, store the data in the memory, analyze the data and recognize an event within the data to determine event data and transmit the event data associated with the event via the radio. Embodiments of the system may also include an application configured to execute on a mobile device wherein the mobile device includes a computer, a wireless communication interface configured to communicate with the radio to obtain the event data associated with the event. The computer is coupled with wireless communication interface wherein the computer executes the application or "app" to configure the computer to receive the event data from the wireless communication interface, analyze the event data to form motion analysis data, store the event data, or the motion analysis data, or both the event data and the motion analysis data, and display information comprising the event data, or the motion analysis data, or both associated with the at least one user on a display.

FIG. 1B illustrates an architectural view of an embodiment of database 172 utilized in embodiments of the system. As shown tables 180-185 include information related to N number of users, M pieces of equipment per user, P number of sensors per user or equipment, S number of sensor data per sensor, T number of patterns found in the other tables, and D number of data users. All tables shown in FIG. 1B are exemplary and may include more or less information as desired for the particular implementation. Specifically, table 180 includes information related to user 150 which may include data related to the user such as age, height, weight, sex, address or any other data. Table 181 include information related to M number of pieces of equipment 110, which may include clubs, racquets, bats, shirts, pants, shoes, gloves, helmets, etc., for example the manufacturer of the equipment, model of the equipment, and type of the equipment. For example, in a golf embodiment, the manufacturer may be the name of the manufacturer, the model may be a name or model number and the type may be the club number, i.e., 9 iron, the equipment ID may be identifier 191 in one or more embodiments of the invention. Table 182 may include information related to P number of sensors 111 on user 150 or equipment 110 or mobile computer 101. The sensors associated with user 150 may include clothing, clubs, helmets, caps, headbands, mouthpieces, etc., the sensors associated with equipment 110 may for example be motion capture data sensors, while the sensors associated with mobile computer 101 may include sensors 167 for position/orientation and sensors 130 for images/video for example. Table 183 may include information related to S number of sensor data per user per equipment, wherein the table may include the time and location of the sensor data, or any other metadata related to the sensor data such as temperature, weather, humidity, as obtained locally via the temperature sensor shown in FIG. 1A, or via wireless communications or in any other manner for example, or the sensor data may include this information or any combination thereof. The table may also contain a myriad of other fields, such as ball type, i.e., in a golf embodiment the type of golf ball utilized may be saved and later data mined for the best performing ball types, etc. This table may also include an event type as calculated locally, for example a potential concussion event. Table 184 may include information related to T number of patterns that have been found in the data mining process for example. This may include fields that have been searched in the various tables with a particular query and any resulting related results. Any data mining results table type may be utilized in one or more embodiments of the invention as desired for the particular implementation. This may include search results of any kind, including EI measurements, which also may be calculated on computer 160 locally, or any other search value from simple queries to complex pattern searches. Table 185 may include information related to D number of data mining users 151 and may include their access type, i.e., full database or pattern table, or limited to a particular manufacturer, etc., the table may also include payment requirements and/or receipts for the type of usage that the data mining user has paid for or agreed to pay for and any searches or suggestions related to any queries or patterns found for example. Any other schema, including object oriented database relationships or memory based data structures that allow for data mining of sensor data including motion capture data is in keeping with the spirit of the invention. Although exemplary embodiments for particular activities are given, one skilled in the art will appreciate that any type of motion based activity may be captured and analyzed by embodiments of the system using a motion capture element and app that runs on a user's existing cell phone 101, 102 or other computer 105 for example.

There are a myriad of applications that benefit and which are enabled by embodiments of the system that provide for viewing and analyzing motion capture data on the mobile computer or server/database, for example for data mining database 172 by users 151. For example, users 151 may include compliance monitors, including for example parents, children or elderly, managers, doctors, insurance companies, police, military, or any other entity such as equipment manufacturers that may data mine for product improvement. For example in a tennis embodiment by searching for top service speeds for users of a particular size or age, or in a golf embodiment by searching for distances, i.e., differences in sequential locations in table 183 based on swing speed in the sensor data field in table 183 to determine which manufacturers have the best clubs, or best clubs per age or height or weight per user, or a myriad of other patterns. Other embodiments related to compliance enable messages from mobile computer 101 or from server/database to be generated if thresholds for G-forces, (high or zero or any other levels), to be sent to compliance monitors, managers, doctors, insurance companies, etc., as previously described. Users 151 may include marketing personnel that determine which pieces of equipment certain users own and which related items that other similar users may own, in order to target sales at particular users. Users 151 may include medical personnel that may determine how much movement a sensor for example coupled with a shoe, i.e., a type of equipment, of a diabetic child has moved and how much this movement relates to the average non-diabetic child, wherein suggestions as per table 185 may include giving incentives to the diabetic child to exercise more, etc., to bring the child in line with healthy children. Sports physicians, physiologists or physical therapists may utilize the data per user, or search over a large number of users and compare a particular movement of a user or range of motion for example to other users to determine what areas a given user can improve on through stretching or exercise and which range of motion areas change over time per user or per population and for example what type of equipment a user may utilize to account for changes over time, even before those changes take place. Data mining motion capture data and image data related to motion provides unique advantages to users 151. Data mining may be performed on flex parameters measured by the sensors to determine if sporting equipment, shoes, human body parts or any other item changes in flexibility over time or between equipment manufacturers or any combination thereof.

To ensure that analysis of user 150 during a motion capture includes images that are relatively associated with the horizon, i.e., not tilted, the system may include an orientation module that executes on computer 160 within mobile device 101 for example. The computer is configured to prompt a user to align the camera along a horizontal plane based on orientation data obtained from orientation hardware within mobile device 101. Orientation hardware is common on mobile devices as one skilled in the art will appreciate. This allows the image so captured to remain relatively level with respect to the horizontal plane. The orientation module may also prompt the user to move the camera toward or away from the user, or zoom in or out to the user to place the user within a graphical "fit box", to somewhat normalize the size of the user to be captured. Images may also be utilized by users to prove that they have complied with doctors orders for example to meet certain motion requirements.

Embodiments of the system are further configured to recognize the at least one motion capture element associated with user 150 or piece of equipment 110 and associate at least one motion capture element 111 with assigned locations on user 150 or piece of equipment 110. For example, the user can shake a particular motion capture element when prompted by the computer within mobile device 101 to acknowledge which motion capture element the computer is requesting an identity for. Alternatively, motion sensor data may be analyzed for position and/or speed and/or acceleration when performing a known activity and automatically classified as to the location of mounting of the motion capture element automatically, or by prompting the user to acknowledge the assumed positions. Sensors may be associated with a particular player by team name and jersey number for example and stored in the memory of the motion capture sensor for transmission of events. Any computer shown in FIG. 1 may be utilized to program the identifier associated with the particular motion capture sensor in keeping with the spirit of the invention.

One or more embodiments of the computer in mobile device 101 is configured to obtain at least one image of user 150 and display a three-dimensional overlay onto the at least one image of user 150 wherein the three-dimensional overlay is associated with the motion analysis data. Various displays may be displayed on display 120. The display of motion analysis data may include a rating associated with the motion analysis data, and/or a display of a calculated ball flight path associated with the motion analysis data and/or a display of a time line showing points in time along a time axis where peak values associated with the motion analysis data occur and/or a suggest training regimen to aid the user in improving mechanics of the user. These filtered or analyzed data sensor results may be stored in database 172, for example in table 183, or the raw data may be analyzed on the database (or server associated with the database or in any other computer or combination thereof in the system shown in FIG. 1 for example), and then displayed on mobile computer 101 or on website 173, or via a television broadcast from camera 104 for example. Data mining results may be combined in any manner with the unique displays of the system and shown in any desired manner as well.

Embodiments of the system may also present an interface to enable user 150 to purchase piece of equipment 110 over the wireless interface of mobile device 101, for example via the Internet, or via computer 105 which may be implemented as a server of a vendor. In addition, for custom fitting equipment, such as putter shaft lengths, or any other custom sizing of any type of equipment, embodiments of the system may present an interface to enable user 150 to order a customer fitted piece of equipment over the wireless interface of mobile device 101. Embodiments of the invention also enable mobile device 101 to suggest better performing equipment to user 150 or to allow user 150 to search for better performing equipment as determined by data mining of database 172 for distances of golf shots per club for users with swing velocities within a predefined range of user 150. This allows for real life performance data to be mined and utilized for example by users 151, such as OEMs to suggest equipment to user 150, and be charged for doing so, for example by paying for access to data mining results as displayed in any computer shown in FIG. 1 or via website 173 for example. In one or more embodiments of the invention database 172 keeps track of OEM data mining and is configured to bill users 151 for the amount of access each of users 151 has purchased and/or used for example over a giving billing period. See FIG. 1B for example.

Embodiments of the system are configured to analyze the data obtained from at least one motion capture element and determine how centered a collision between a ball and the piece of equipment is based on oscillations of the at least one motion capture element coupled with the piece of equipment and display an impact location based on the motion analysis data. This performance data may also be stored in database 172 and used by OEMs or coaches for example to suggest clubs with higher probability of a centered hit as data mined over a large number of collisions for example.

While FIG. 1A depicts a physical device, the scope of the systems and methods set forth herein may also encompass a virtual device, virtual machine or simulator embodied in one or more computer programs executing on a computer or computer system and acting or providing a computer system environment compatible with the methods and processes implementing the disclosed ideas. Where a virtual machine, process, device or otherwise performs substantially similarly to that of a physical computer system of the system, such a virtual platform will also fall within the scope of a system of the disclosure, notwithstanding the description herein of a physical system such as that in FIG. 1A.

FIG. 1C illustrates a flow chart for an embodiment of the processing performed and enabled by embodiments of the computers utilized in the system. In one or more embodiments of the system, a plurality of motion capture elements are optionally calibrated at 301. In some embodiments this means calibrating multiple sensors on a user or piece of equipment to ensure that the sensors are aligned and/or set up with the same speed or acceleration values for a given input motion. In other embodiments of the invention, this means placing multiple motion capture sensors on a calibration object that moves and calibrates the orientation, position, speed, acceleration, or any combination thereof at the same time. This step general includes providing motion capture elements and optional mount (or alternatively allowing a mobile device with motion capture sensing capabilities to be utilized), and an app for example that allows a user with an existing mobile phone or computer to utilize embodiments of the system to obtain motion capture data, and potentially analyze and/or send messages based thereon. In one or more embodiments, users may simply purchase a motion capture element and an app and begin immediately using the system. The system captures motion data with motion capture element(s) at 302, recognized any events within the motion capture data, i.e., a linear and/or rotational acceleration over a threshold indicative of a concussion for example at 303, and sends the motion capture data to a mobile computer 101, 102 or 105 for example, which may include an IPOD®, ITOUCH®, IPAD®, IPHONE®, ANDROID® Phone or any other type of computer that a user may utilize to locally collect data at 304. In one or more embodiments, the system minimizes the complexity of the sensor and offloads processing to extremely capable computing elements found in existing mobile phones and other electronic devices for example. The transmitting of data from the motion capture elements to the user's computer may happen when possible, periodically, on an event basis, when polled, or in any other manner as will be described in various sections herein. This saves great amount of power compared to known systems that continuously send raw data in two ways, first data may be sent in event packets, within a time window around a particular motion event which greatly reduces the data to a meaningful small subset of total raw data, and secondly the data may be sent less than continuously, or at defined times, or when asked for data so as to limit the total number of transmissions. In one or more embodiments, the event may displayed locally, for example with an LED flashing on the motion capture sensor 111, for example yellow slow flashing for potential concussion or red fast flashing for probably concussion at 305. Alternatively, or in combination, the alert or event may be transmitted and displayed on any other computer or mobile device shown in FIG. 1 for example.

The main intelligence in the system is generally in the mobile computer or server where more processing power may be utilized and so as to take advantage of the communications capabilities that are ubiquitous in existing mobile computers for example. In one or more embodiments of the system, the mobile computer may optionally obtain an identifier from the user or equipment at 306, or this identifier may be transmitted as part of step 305, such as a passive RFID or active RFID or other identifier such as a team/jersey number or other player ID, which may be utilized by the mobile computer to determine what user has just been potentially injured, or what weight as user is lifting, or what shoes a user is running with, or what weapon a user is using, or what type of activity a user is using based on the identifier of the equipment. The mobile computer may analyze the motion capture data locally at 307 and display, i.e., show or send information such as a message for example when a threshold is observed in the data, for example when too many G-forces have been registered by a player, soldier or race car driver, or when not enough motion is occurring (either at the time or based on the patterns of data in the database as discussed below based on the user's typical motion patterns or other user's motion patterns for example.) In other embodiments, once a user has performed a certain amount of motion, a message may be sent to safety or compliance monitor(s) at 307 to store or otherwise display the data, including for example referees, parents, children or elderly, managers, doctors, insurance companies, police, military, or any other entity such as equipment manufacturers. The message may be an SMS message, or email, or tweet or any other type of electronic communication. If the particular embodiment is configured for remote analysis or only remote analysis, then the motion capture data may be sent to the server/database at 308. If the implementation does not utilize a remote database, the analysis on the mobile computer is local. If the implementation includes a remote database, then the analysis may be performed on the mobile computer or server/database or both at 309. Once the database obtains the motion capture data, then the data may be analyzed and a message may be sent from the server/database to compliance personnel or business entities as desired to display the event alone or in combination or with respect to previous event data associated with the user or other users at 310.

Embodiments of the invention make use of the data from the mobile computer and/or server for gaming, morphological comparing, compliance, tracking calories burned, work performed, monitoring of children or elderly based on motion or previous motion patterns that vary during the day and night, safety monitoring for players, troops when G-forces exceed a threshold or motion stops, local use of running, jumping throwing motion capture data for example on a cell phone including virtual reality applications that make use of the user's current and/or previous data or data from other users, or play music or select a play list based on the type of motion a user is performing or data mining. For example if motion is similar to a known player in the database, then that user's playlist may be sent to the user's mobile computer 101. The processing may be performed locally so if the motion is fast, fast music is played and if the motion is slow, then slow music may be played. Any other algorithm for playing music based on the motion of the user is in keeping with the spirit of the invention. Any use of motion capture data obtained from a motion capture element and app on an existing user's mobile computer is in keeping with the spirit of the invention, including using the motion data in virtual reality environments to show relative motion of an avatar of another player using actual motion data from the user in a previous performance or from another user including a historical player for example. Display of information is generally performed via three scenarios, wherein display information is based on the user's motion analysis data or related to the user's piece of equipment and previous data, wherein previous data may be from the same user/equipment or one or more other users/equipment. Under this scenario, a comparison of the current motion analysis data with previous data associated with this user/equipment allows for patterns to be analyzed with an extremely cost effective system having a motion capture sensor and app. Under another scenario, the display of information is a function of the current user's performance, so that the previous data selected from the user or another user/equipment is based on the current user's performance. This enables highly realistic game play, for example a virtual tennis game against a historical player wherein the swings of a user are effectively responded to by the capture motion from a historical player. This type of realistic game play with actual data both current and previously stored data, for example a user playing against an average pattern of a top 10 player in tennis, i.e., the speed of serves, the speed and angle of return shots, for a given input shot of a user makes for game play that is as realistic as is possible. Television images may be for example analyzed to determine swing speeds and types of shots taken by historical players that may no longer be alive to test one's skills against a master, as if the master was still alive and currently playing the user. Compliance and monitoring by the user or a different user may be performed in a third scenario without comparison to the user's previous or other user's previous data wherein the different user does not have access to or own for example the mobile computer. In other words, the mobile phone is associated with the user being monitored and the different user is obtaining information related to the current performance of a user for example wearing a motion capture element, such as a baby, or a diabetes patient.

Figure 1D:
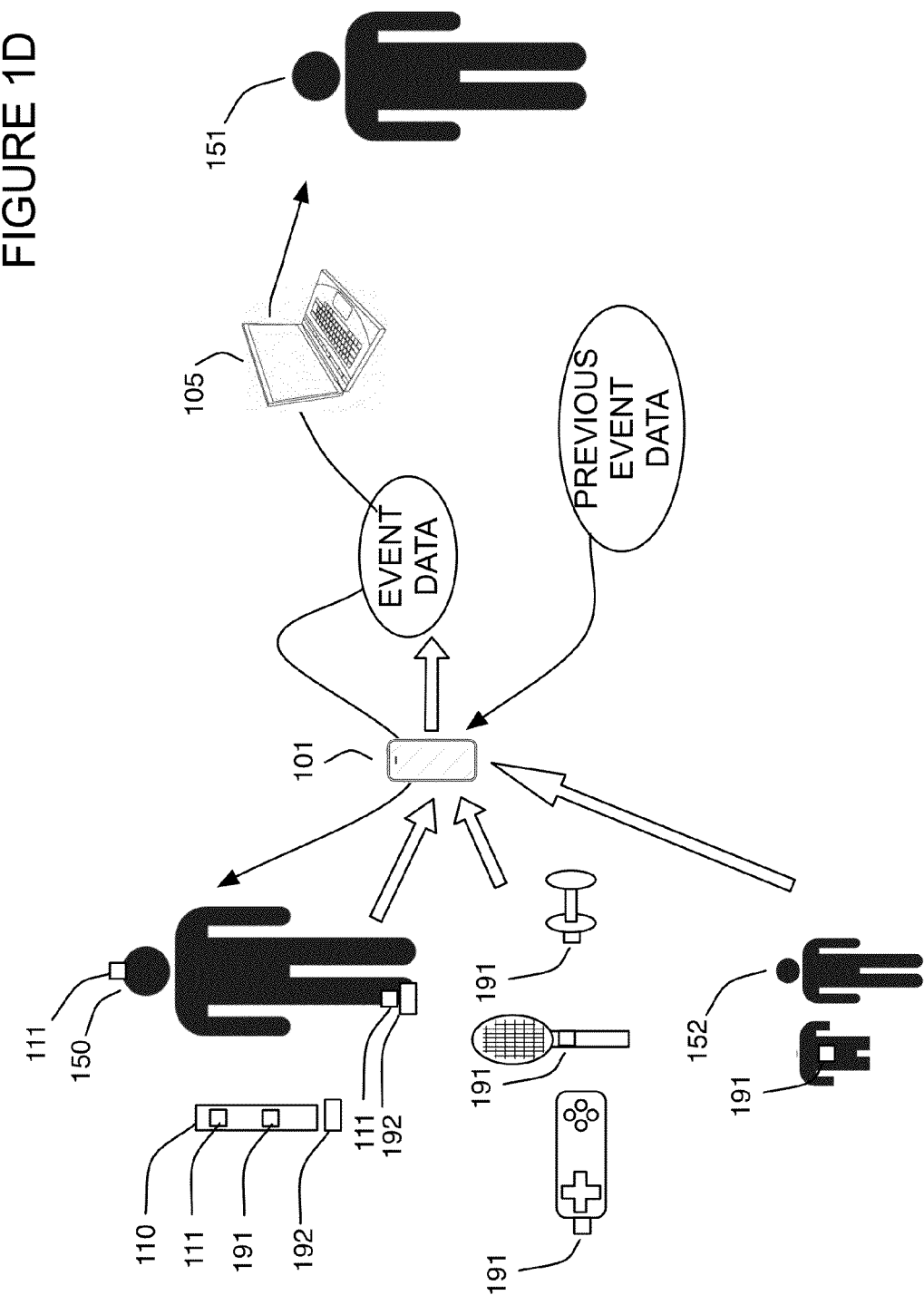
FIG. 1D illustrates a data flow diagram for an embodiment of the system.

FIG. 1D illustrates a data flow diagram for an embodiment of the system. As shown motion capture data is sent from a variety of motion capture elements 111 on many different types of equipment 110 or associated with user 150, for example on clothing, a helmet, headband, cap, mouthpiece or anywhere else coupled with the user. The equipment or user may optionally have an identifier 191 that enables the system to associate a value with the motion, i.e., the weight being lifted, the type of racquet being used, the type of electronic device being used, i.e., a game controller or other object such as baby pajamas associated with second user 152, e.g., a baby. In one or more embodiments, elements 191 in the figure may be replaced or augmented with motion capture elements 111 as one skilled in the art will appreciate. In one or more embodiments of the system, mobile computer 101 receives the motion capture data, for example in event form and for example on an event basis or when requested by mobile computer 101, e.g., after motion capture elements 111 declares that there is data and turns on a receiver for a fix amount of time to field requests so as to not waste power, and if no requests are received, then turn the receiver off for a period of time. Once the data is in mobile computer 101, then the data is analyzed, for example to take raw or event based motion capture data and for example determine items such as average speed, etc., that are more humanly understandable in a concise manner. The data may be stored, shown to the right of mobile computer 101 and then the data may be displayed to user 150, or 151, for example in the form of a monitor or compliance text or email or on a display associated with mobile computer 101 or computer 105. This enables users not associated with the motion capture element and optionally not even the mobile computer potentially to obtain monitor messages, for example saying that the baby is breathing slowly, or for example to watch a virtual reality match or performance, which may include a user supplying motion capture data currently, a user having previously stored data or a historical player, such as a famous golfer, etc., after analysis of motion in video from past tournament performance(s). In gaming scenarios, where the data obtained currently, for example from user 150 or equipment 110, the display of data, for example on virtual reality glasses may make use of the previous data from that user/equipment or another user/equipment to respond to the user's current motion data, i.e., as a function of the user's input. The previous data may be stored anywhere in the system, e.g., in the mobile computer 101, computer 105 or on the server or database 172 (see FIG. 1). The previous data may be utilized for example to indicate to user 151 that user 150 has undergone a certain number of potential concussion events, and therefore must heal for a particular amount of time before playing again. Insurance companies may demand such compliance to lower medical expenses for example.

FIG. 2A illustrates a helmet 110a based mount that surrounds the head 150a of a user wherein the helmet based mount holds a motion capture sensor 111, for example as shown on the rear portion of the helmet. FIG. 2B illustrates a neck insert based mount, shown at the bottom rear portion of the helmet, that enables retrofitting existing helmets with a motion capture sensor 111. In embodiments that include at least one motion capture sensor that is configured to be coupled with or otherwise worn near the user's head 150a, the microcontroller may be further configured to calculate of a location of impact on the user's head. The calculation of the location of impact on the user's head is based on the physical geometry of the user's head and/or helmet. For example, if motion capture element 111 indicates a rearward acceleration with no rotation (to the right in the figure as shown), then the location of impact may be calculated by tracing the vector of acceleration back to the direction of the outside perimeter of the helmet or user's head. This non-rotational calculation effectively indicates that the line of force passes near or through the center of gravity of the user's head/helmet, otherwise rotational forces are observed by motion capture element 111. If a sideward vector is observed at the motion capture element 111, then the impact point is calculated to be at the side of the helmet/head and through the center of gravity. Hence, any other impact that does not impart a rotational acceleration to the motion capture sensor over at least a time period near the peak of the acceleration for example, or during any other time period, may be assumed to be imparted in a direction to the helmet/head that passes through the center of gravity. Hence, the calculation of the point of impact is calculated as the intersection of the outer perimeter of the helmet/head that a vector of force is detected and traversed backwards to the point of impact by calculating the distance and angle back from the center of gravity. For example, if the acceleration vector is at 45 degrees with no rotation, then the point of impact is 45 degrees back from the center of gravity of the helmet/head, hence calculating the sine of 45, approximately 0.7 multiplied by the radius of the helmet or 5 inches, results in an impact about 3.5 inches from the front of the helmet. Alternatively, the location of impact may be kept in angular format to indicate that the impact was at 45 degrees from the front of the helmet/head. Conversely, if rotational acceleration is observed without linear acceleration, then the helmet/head is rotating about the sensor. In this scenario, the force required to rotate the brain passes in front of the center of gravity and is generally orthogonal to a line defined as passing through the center of gravity and the sensor, e.g., a side impact, otherwise translation linear acceleration would be observed. In this case, the location of impact then is on the side of the helmet/head opposite the direction of the acceleration. Hence, these two calculations of location of impact as examples of simplified methods of calculations that may be utilized although any other vector based algorithm that takes into account the mass of the head/helmet and the size of the head/helmet may be utilized. One such algorithm may utilize any mathematical equations such as F=m*a, i.e., Force equal mass times acceleration, and Torque=r X F, where r is the position vector at the outer portion of the head/helmet, X is the cross product and F is the Force vector, to calculate the force vector and translate back to the outer perimeter of the helmet/head to calculate the Force vector imparted at that location if desired. Although described with respect to a helmet, other embodiments of the at least one motion capture sensor may be configured to be coupled with a hat or cap, within a protective mouthpiece, using any type of mount, enclosure or coupling mechanism. Similar calculations may be utilized for the hat/cap/mouthpiece to determine a location/direction of impact, linear or rotational forces from the accelerations or any other quantities that may be indicative of concussion related events for example. Embodiments may include a temperature sensor coupled with the at least one motion capture sensor or with the microcontroller for example as shown in FIG. 1A. The temperature sensor may be utilized alone or in combination with the motion capture element, for example to determine if the body or head is shivering, i.e., indicative of hypothermia, or if no movement is detected and the temperature for example measure wirelessly or via a wire based temperature sensor indicates that the body or brain is above a threshold indicative of heat stroke.

Embodiments of the invention may also utilize an isolator configured to surround the at least one motion capture element to approximate physical acceleration dampening of cerebrospinal fluid around the user's brain to minimize translation of linear acceleration and rotational acceleration of the event data to obtain an observed linear acceleration and an observed rotational acceleration of the user's brain. Thus embodiments do not have to translate forces or acceleration values or any other values from the helmet based acceleration to the observed brain acceleration values and thus embodiments of the invention utilize less power and storage to provide event specific data, which in turn minimizes the amount of data transfer which yields lower transmission power utilization. Different isolators may be utilized on a football/hockey/lacrosse player's helmet based on the type of padding inherent in the helmet. Other embodiments utilized in sports where helmets are not worn, or occasionally worn may also utilize at least one motion capture sensor on a cap or hat, for example on a baseball player's hat, along with at least one sensor mounted on a batting helmet. Headband mounts may also be utilized in sports where a cap is not utilized, such as soccer to also determine concussions. In one or more embodiments, the isolator utilized on a helmet may remain in the enclosure attached to the helmet and the sensor may be removed and placed on another piece of equipment that does not make use of an isolator that matches the dampening of a user's brain fluids. Embodiments may automatically detect a type of motion and determine the type of equipment that the motion capture sensor is currently attached to based on characteristic motion patterns associated with certain types of equipment, i.e., surfboard versus baseball bat. In one or more embodiments an algorithm that may be utilized to calculate the physical characteristics of an isolator may include mounting a motion capture sensor on a helmet and mounting a motion capture sensor in a headform in a crash test dummy head wherein the motion capture sensor in the headform is enclosed in an isolator. By applying linear and rotational accelerations to the helmet and observing the difference in values obtained by the helmet sensor and observed by the sensor in the headform for example with respect to a sensor placed in a cadaver head within a helmet, the isolator material of the best matching dampening value may be obtained that most closely matches the dampening effect of a human brain.

Figure 3:
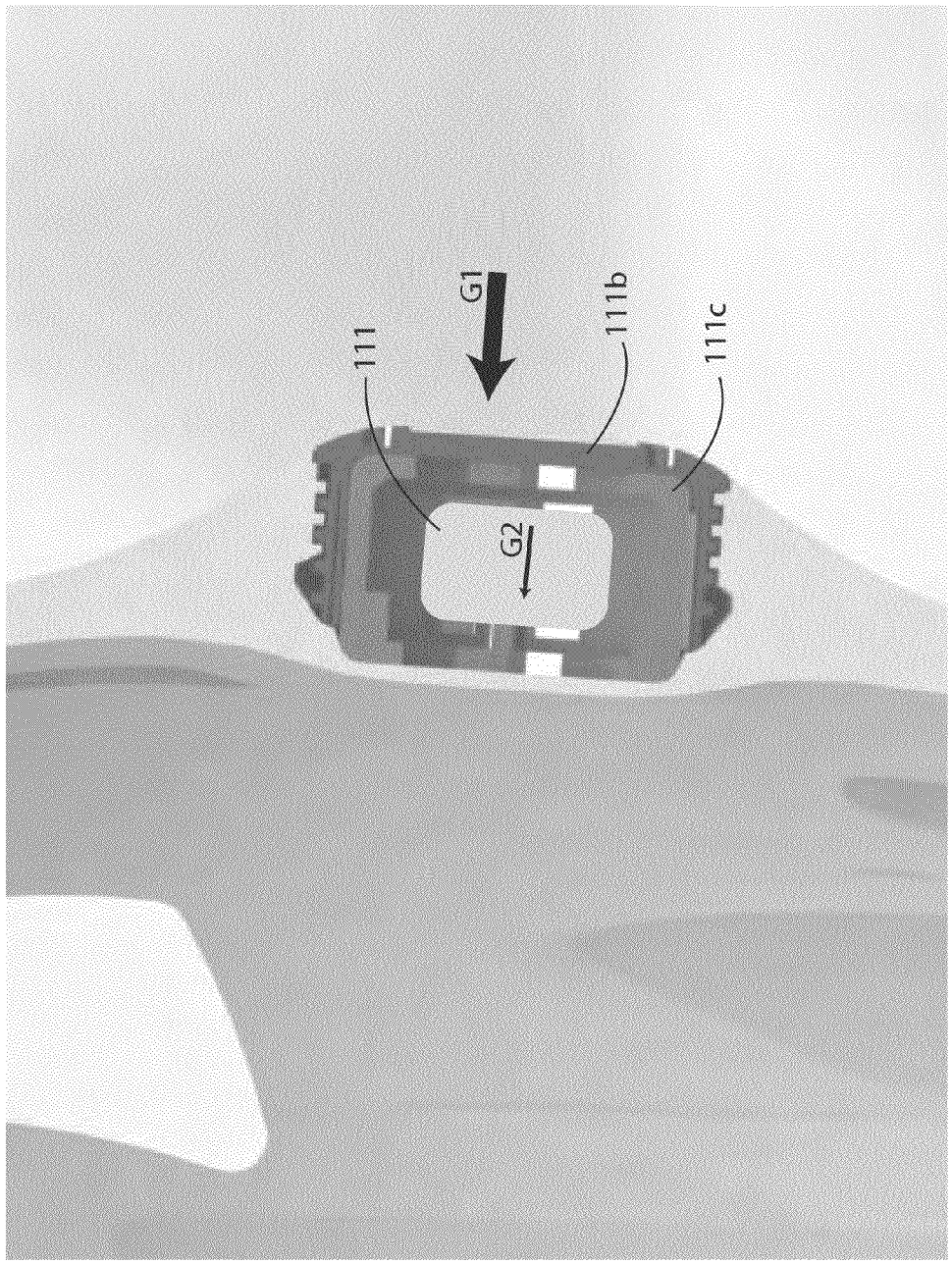
FIG. 3 illustrates a close-up of the mount of FIGS. 2A-B showing the isolator between the motion capture sensor and external portion of the helmet.

FIG. 3 illustrates a close-up of the mount of FIGS. 2A-B showing the isolator between the motion capture sensor and external portion of the helmet. Embodiments of the invention may be configured to obtain/calculate a linear acceleration value or a rotational acceleration value or both. This enables rotational events to be monitored for concussions as well as linear accelerations. As shown, an external acceleration G1 may impart a lower acceleration more associated with the acceleration observed by the human brain, namely G2 on sensor 111 by utilizing isolator 111c within sensor mount 111b. This enables rotational events to be monitored for concussions as well as linear accelerations. Other events may make use of the linear and/or rotational acceleration and/or velocity, for example as compared against patterns or templates to not only switch sensor personalities during an event to alter the capture characteristics dynamically, but also to characterize the type of equipment currently being utilized with the current motion capture sensor. This enables a single motion capture element purchase by a user to instrument multiple pieces of equipment or clothing by enabling the sensor to automatically determine what type of equipment or piece of clothing the sensor is coupled to based on the motion captured by the sensor when compared against characteristic patterns or templates of motion.

FIG. 4A illustrates a top cross sectional view of the motion capture element 111 mounted on helmet 110a having padding 110a1 that surrounds cranium 401, and brain 402 of a user. FIG. 4B illustrates a rotational concussion event for the various elements shown in FIG. 4. As shown, different acceleration values may be imparted on the human brain 402 and cranium 401 having center of gravity 403 and surrounded by padding 110a1 in helmet 110a. As shown, to move within a unit time period, the front portion of the brain must accelerate at a higher rate G2a, than the rear portion of the brain at G2c or at G2b at the center of gravity. Hence, for a given rotational acceleration value different areas of the brain may be affected differently. One or more embodiments of the invention may thus transmit information not only related to linear acceleration, but also with rotational acceleration.

Figure 5:
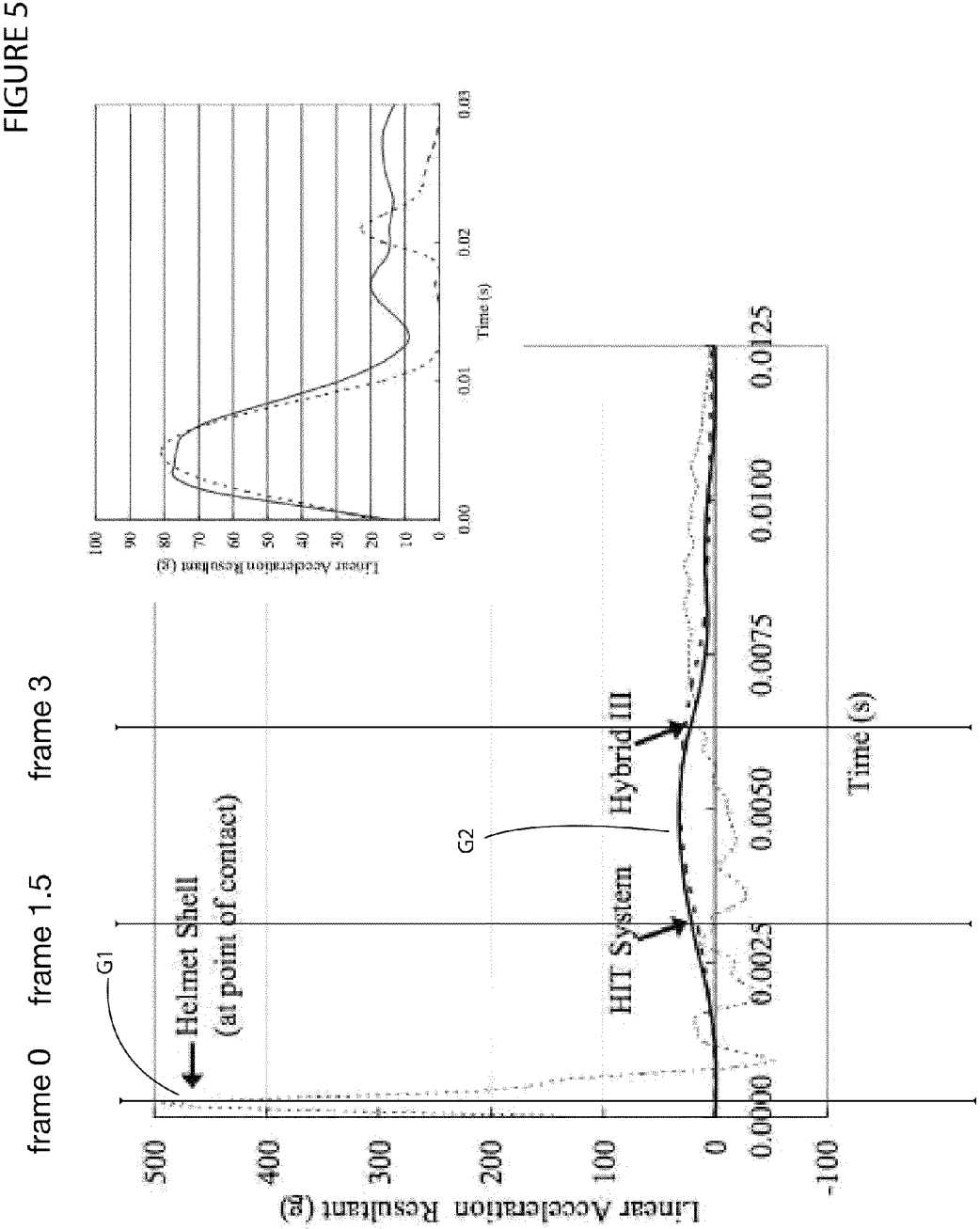
FIG. 5 illustrates the input force to the helmet, G1, versus the observed force within the brain and as observed by the sensor when mounted within the isolator.

FIG. 5 illustrates the input force to the helmet, G1, e.g., as shown at 500 g, versus the observed force within the brain G2, and as observed by the sensor when mounted within the isolator and as confirmed with known headform acceleration measurement systems. The upper right graph shows that two known headform systems confirm acceleration values observed by an isolator based motion capture element 111 shown in FIG. 4A with respect to headform mounted accelerometers.

Figure 6:
FIG. 6 illustrates the rotational acceleration values of the 3 axes along with the total rotational vector amount along with video of the concussion event as obtained from a camera and displayed with the motion event data.

FIG. 6 illustrates the rotational acceleration values of the 3 axes along with the total rotational vector amount along with video of the concussion event as obtained from a camera and displayed with the motion event data. In one or more embodiments, the acceleration values from a given sensor may be displayed for rotational (as shown) or linear values, for example by double tapping a mobile device screen, or in any other manner. Embodiments of the invention may transmit the event data associated with the event using a connectionless broadcast message. In one or more embodiments, depending on the wireless communication employed, broadcast messages may include payloads with a limited amount of data that may be utilized to avoid handshaking and overhead of a connection based protocol. In other embodiments connectionless or connection based protocols may be utilized in any combination. In this manner, a referee may obtain nearly instantaneous readouts of potential concussion related events on a mobile device, which allows the referee to obtain medical assistance in rapid fashion.

In one or more embodiments, the computer may access previously stored event data or motion analysis data associated with the user or piece of equipment, for example to determine the number of concussions or falls or other swings, or any other motion event. Embodiments may also present event data associated with the at least one user on a display based on the event data or motion analysis data associated with the user or piece of equipment and the previously stored event data or motion analysis data associated with the user or piece of equipment or with at least one other user or other piece of equipment. This enables comparison of motion events, in number or quantitative value, e.g., the maximum rotational acceleration observed by the user or other users in a particular game or historically. In addition, patterns or templates that define characteristic motion of particular pieces of equipment for typical events may be dynamically updated, for example on a central server or locally, and dynamically updated in motion capture sensors via the wireless interface in one or more embodiments. This enables sensors to improve over time. Hence, the display shown in FIG. 6 may also indicate the number of concussions previously stored for a given boxer/player and enable the referee/doctor to make a decision as to whether or not the player may keep playing or not.

Embodiments of the invention may transmit the information to a display on a visual display coupled with the computer or a remote computer, for example over broadcast television or the Internet for example. Hence, the display in FIG. 6 may be also shown to a viewing audience, for example in real-time to indicate the amount of force imparted upon the boxer/player/rider, etc.

Figure 7:
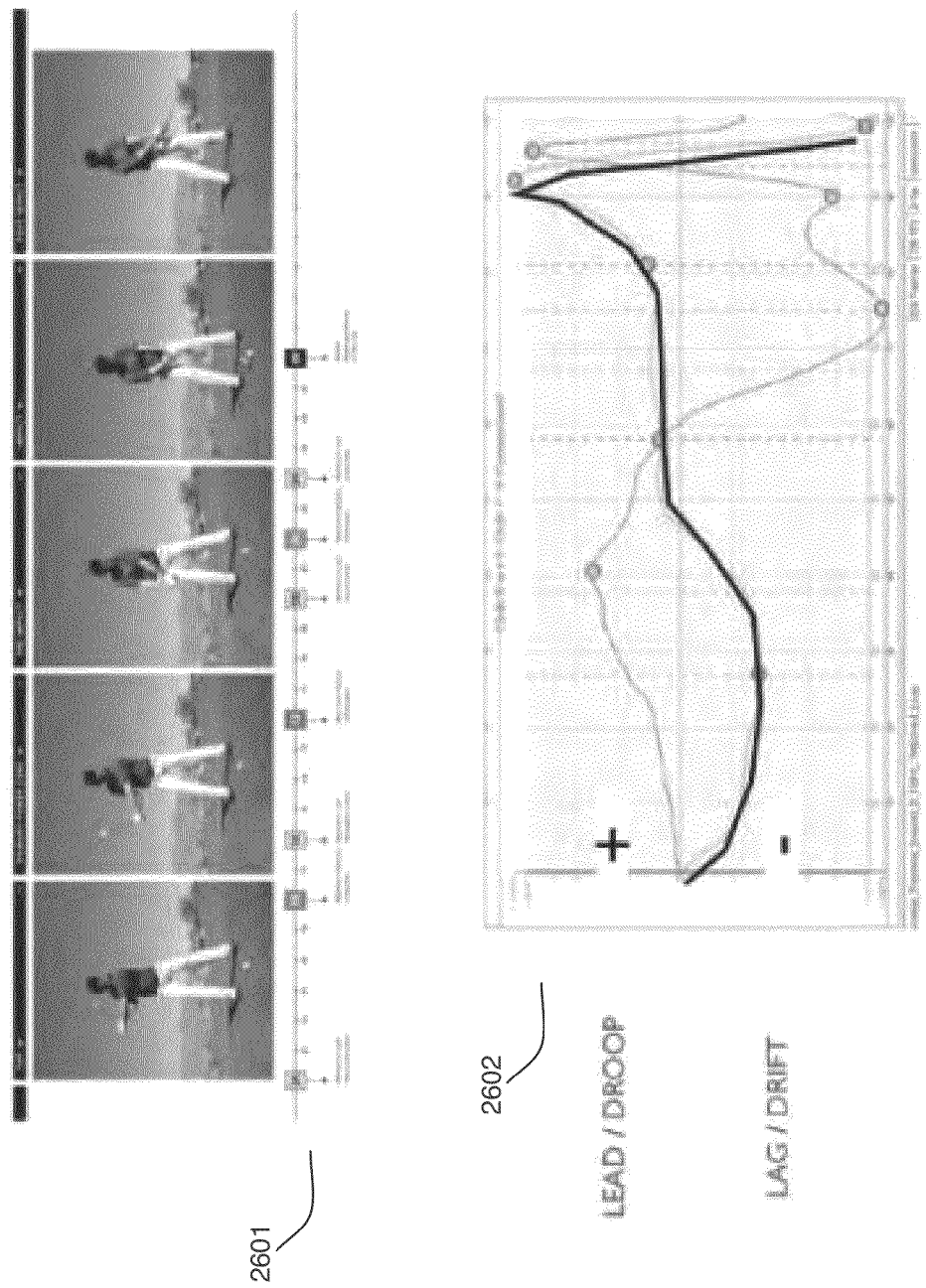
FIG. 7 illustrates a timeline display of a user along with peak and minimum angular speeds along the timeline shown as events along the time line. In addition, a graph showing the lead and lag of the golf club along with the droop and drift of the golf club is shown in the bottom display wherein these values determine how much the golf club shaft is bending in two axes as plotted against time.

FIG. 7 illustrates a timeline display 2601 of a user along with peak and minimum angular speeds along the timeline shown as events along the time line. In addition, a graph showing the lead and lag of the golf club 2602 along with the droop and drift of the golf club is shown in the bottom display wherein these values determine how much the golf club shaft is bending in two axes as plotted against time. An embodiment of the display is shown in FIG. 8 with simplified time line and motion related event (maximum speed of the swing) annotated on the display.

Figure 8:
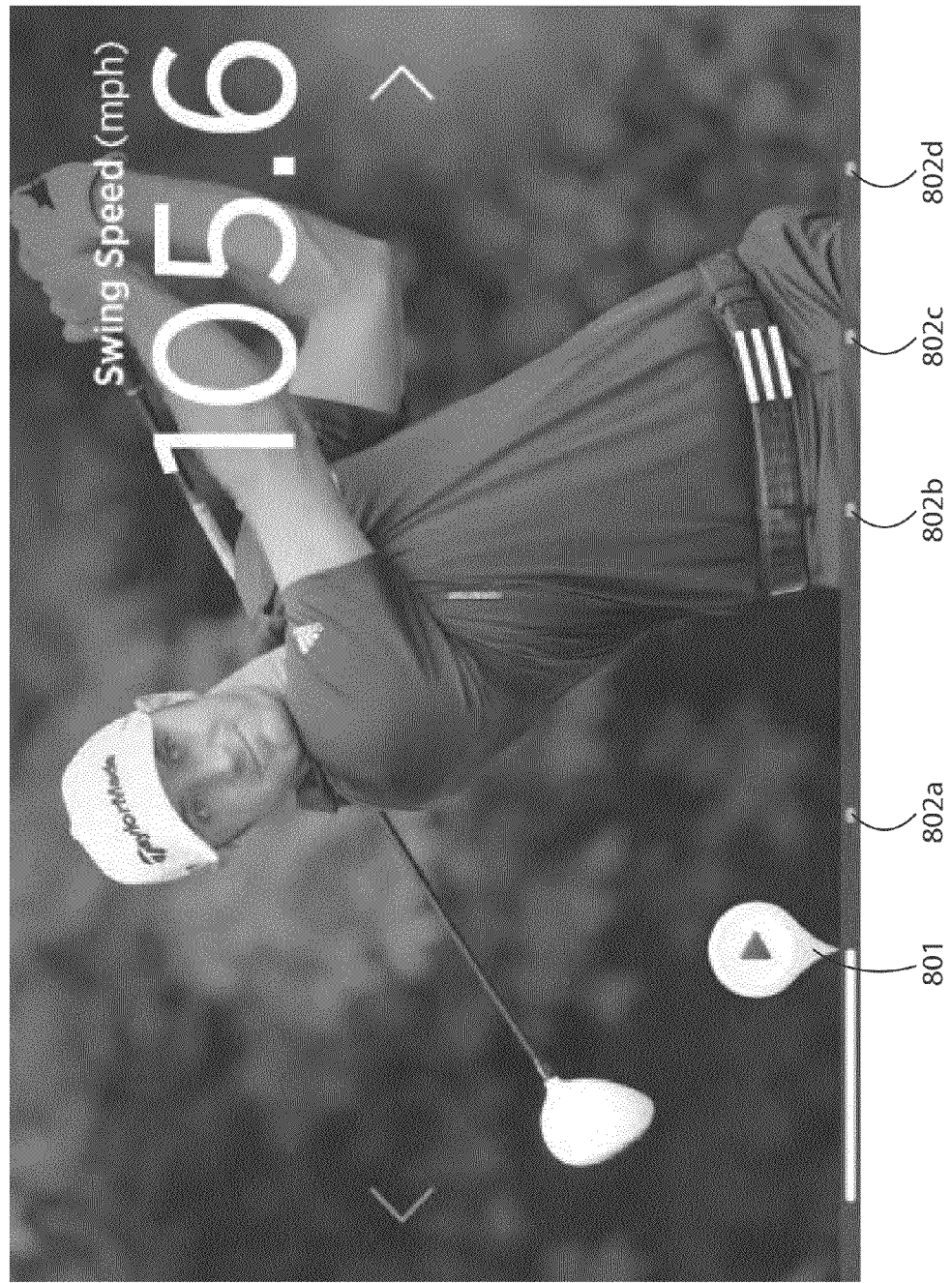
FIG. 8 illustrates a sub-event scrub timeline that enables inputs near the start/stop points in time associated with sub-events to be scrolled to, played to or from, to easily enable viewing of sub-events.

FIG. 8 illustrates a sub-event scrub timeline that enables inputs near the start/stop points 802a-d in time, i.e., sub-event time locations shown in FIG. 7 and associated with sub-events to be scrolled to, played to or from, to easily enable viewing of sub-events. For example a golf swing may include sub-events such as an address, swing back, swing forward, strike, follow through. The system may display time locations for the sub-events 802a-d and accept user input near the location to assert that the video should start or stop at that point in time, or scroll to or back to that point in time for ease of viewing sub-events for example. User input element 801 may be utilized to drag the time to a nearby sub-event for example to position the video at a desired point in time. Alternatively, or in combination a user input such as asserting a finger press near another sub-event point in time while the video is playing, may indicate that the video should stop at the next sub-event point in time.

Figure 9:
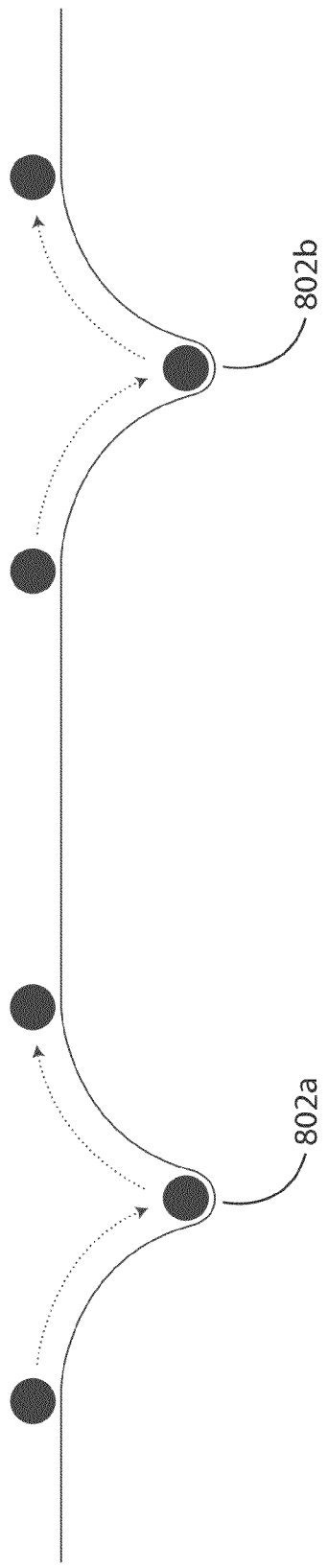
FIG. 9 illustrates the relative locations along the timeline where sub-events start and stop and the gravity associated with the start and stop times, which enable user inputs near those points to gravitate to the start and stop times.

FIG. 9 illustrates the relative locations along the timeline where sub-events 802a and 802b start and stop and the gravity associated with the start and stop times, which enable user inputs near those points to gravitate to the start and stop times. For example, when dragging the user interface element 801 left and right along the time line, the user interface element may appear to move toward the potential well 802a and 802b, so that the user interface element is easier to move to the start/stop point of a sub-event.

In one or more embodiments, the computer is further configured to request at least one image or video that contains the event from at least one camera proximal to the event. This may include a broadcast message requesting video from a particular proximal camera or a camera that is pointing in the direction of the event. In one or more embodiments, the computer is further configured to broadcast a request for camera locations proximal to the event or oriented to view the event, and optionally display the available cameras, or videos therefrom for the time duration around the event of interest. In one or more embodiments, the computer is further configured to display a list of one or more times at which the event has occurred, which enables the user obtain the desired event video via the computer, and/or to independently request the video from a third party with the desired event times.

Figure 10:
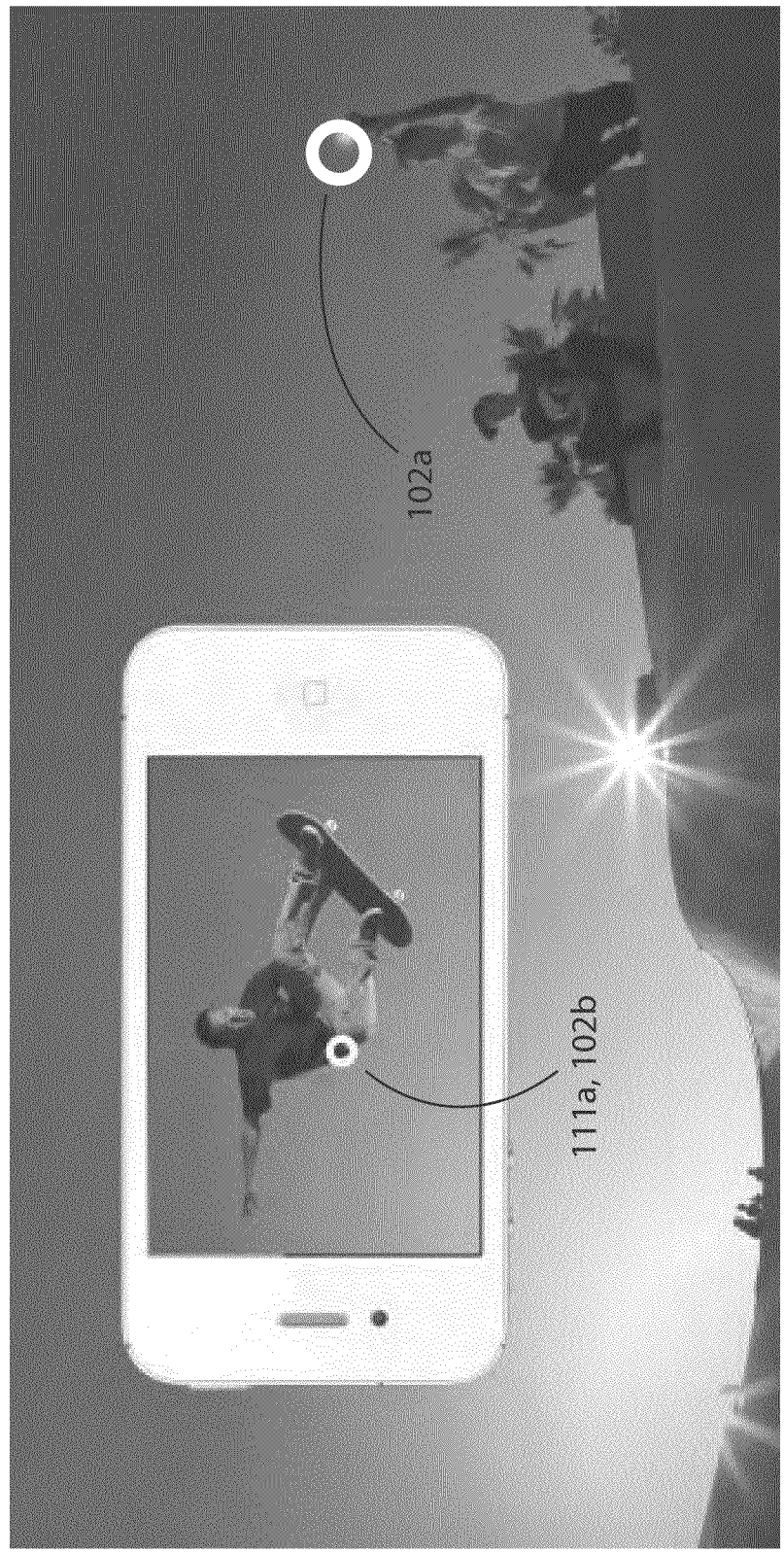
FIG. 10 illustrates an embodiment that utilizes a mobile device as the motion capture element and another mobile device as the computer that receives the motion event data and video of the first user event.

FIG. 10 illustrates an embodiment that utilizes a mobile device 102b as the motion capture element 111a and another mobile device 102a as the computer that receives the motion event data and video of the first user event. The view from mobile device 102a is shown in the left upper portion of the figure. In one or more embodiments, the at least one motion capture sensor is coupled with the mobile device and for example uses an internal motion sensor 111a within or coupled with the mobile device. This enables motion capture and event recognition with minimal and ubiquitous hardware, e.g., using a mobile device with a built-in accelerometer. In one or more embodiments, a first mobile device 102b may be coupled with a user recording motion data, here shown skateboarding, while a second mobile device 102a is utilized to record a video of the motion. In one or more embodiments, the user undergoing motion may gesture, e.g., tap N times on the mobile device to indicate that the second user's mobile device should start recording video or stop recording video. Any other gesture may be utilized to communicate event related or motion related indications between mobile devices.

Thus embodiments of the invention may recognize any type of motion event, including events related to motion that is indicative of standing, walking, falling, a heat stroke, seizure, violent shaking, a concussion, a collision, abnormal gait, abnormal or non-existent breathing or any combination thereof or any other type of event having a duration of time during with motion occurs. Events may also be of any granularity, for example include sub-events that have known signatures, or otherwise match a template or pattern of any type, including amplitude and/or time thresholds in particular sets of linear or rotational axes. For example, events indicating a skateboard push-off or series of pushes may be grouped into a sub-event such as "prep for maneuver", while rotational axes in X for example may indicate "skateboard flip/roll". In one or more embodiments, the events may be grouped and stored/sent.

Figure 11:
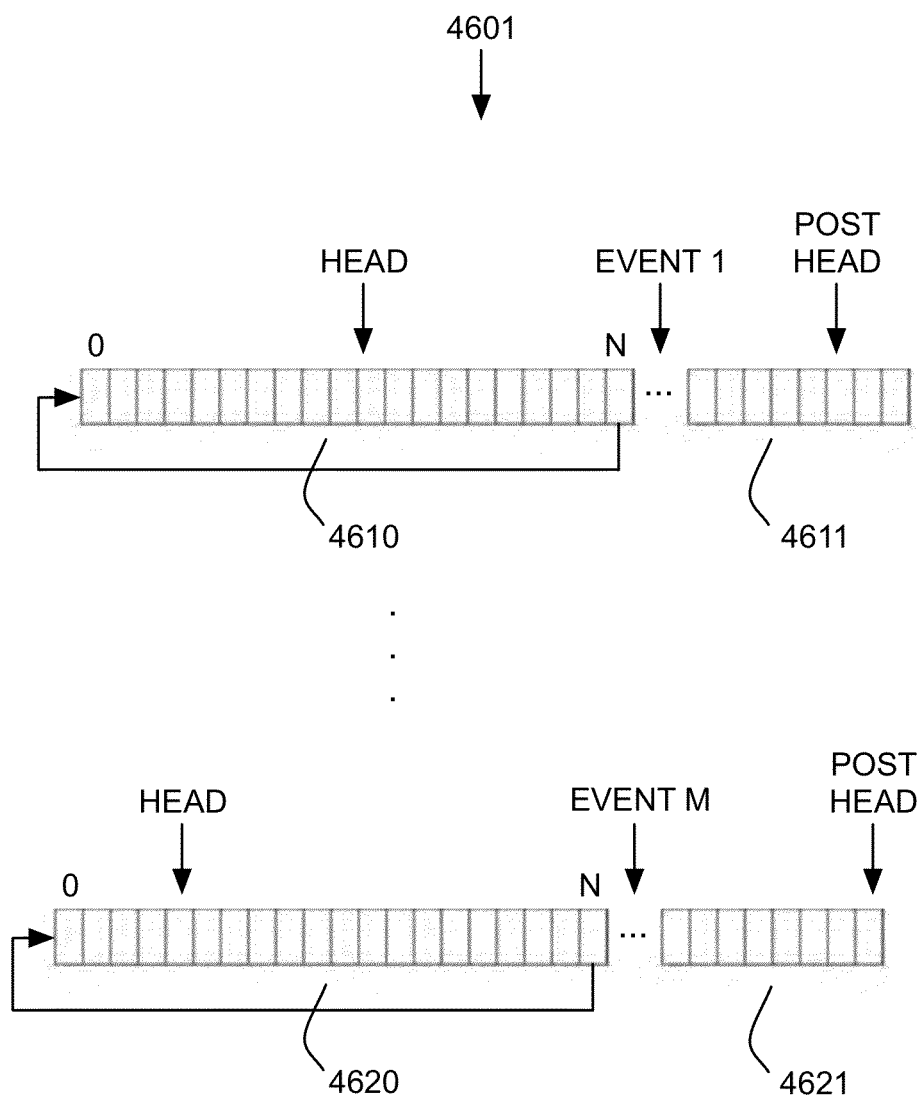
FIG. 11 illustrates an embodiment of the memory utilized to store data related to a potential event.

FIG. 11 illustrates an embodiment of the memory utilized to store data. Memory 4601 may for example be integral to the microcontroller in motion capture element 111 or may couple with the microcontroller, as for example a separate memory chip. Memory 4601 as shown may be configured to include one or more memory buffer 4610, 4611 and 4620, 4621 respectively. One embodiment of the memory buffer that may be utilized is a ring buffer. The ring buffer may be implemented to be overwritten multiple times until an event occurs. The length of the ring buffer may be from 0 to N memory units. There may for example be M ring buffers, for M strike events for example. The number M may be any number greater than zero. In one or more embodiments, the number M may be equal to or greater than the number of expected events, e.g., number of hits, or shots for a round of golf, or any other number for example that allows all motion capture data to be stored on the motion capture element until downloaded to a mobile computer or the Internet after one or more events. In one embodiment, a pointer, for example called HEAD keeps track of the head of the buffer. As data is recorded in the buffer, the HEAD is moved forward by the appropriate amount pointing to the next free memory unit. When the buffer becomes full, the pointer wraps around to the beginning of the buffer and overwrites previous values as it encounters them. Although the data is being overwritten, at any instance in time (t), there is recorded sensor data from time (t) back depending on the size of the buffer and the rate of recording. As the sensor records data in the buffer, an "Event" in one or more embodiments stops new data from overwriting the buffer. Upon the detection of an Event, the sensor can continue to record data in a second buffer 4611 to record post Event data, for example for a specific amount of time at a specific capture rate to complete the recording of a prospective shot. Memory buffer 4610 now contains a record of data for a desired amount of time from the Event backwards, depending on the size of the buffer and capture rate along with post Event data in the post event buffer 4611.

For example, in a golf swing, the event can be the impact of the club head with the ball. Alternatively, the event can be the impact of the club head with the ground, which could give rise to a false event. In other embodiments, the event may be an acceleration of a user's head which may be indicative of a concussion event, or a shot fired from a weapon, or a ball striking a baseball bat or when a user moves a weight to the highest point and descends for another repetition. The Pre-Event buffer stores the sensor data up to the event of impact, the Post-Event buffer stores the sensor data after the impact event. One or more embodiments of the microcontroller are configured to analyze the event and determine if the event is a repetition, firing or event such as a strike or a false strike. If the event is considered a valid event according to a pattern or signature or template (see FIGS. 13 and 15), and not a false event, then another memory buffer 4620 is used for motion capture data up until the occurrence of a second event. After that event occurs, the post event buffer 4621 is filled with captured data.

Specifically, the motion capture element 111 may be implemented as one or more MEMs sensors. The sensors may be commanded to collect data at specific time intervals. At each interval, data is read from the various MEMs devices, and stored in the ring buffer. A set of values read from the MEMs sensors is considered a FRAME of data. A FRAME of data can be 0, 1, or multiple memory units depending on the type of data that is being collected and stored in the buffer. A FRAME of data is also associated with a time interval. Therefore frames are also associated with a time element based on the capture rate from the sensors. For example, if each Frame is filled at 2 ms intervals, then 1000 FRAMES would contain 2000 ms of data (2 seconds). In general, a FRAME does not have to be associated with time.

Data can be constantly stored in the ring buffer and written out to non-volatile memory or sent over a wireless or wired link over a radio/antenna to a remote memory or device for example at specified events, times, or when communication is available over a radio/antenna to a mobile device or any other computer or memory, or when commanded for example by a mobile device, i.e., "polled", or at any other desired event.

Figure 12:
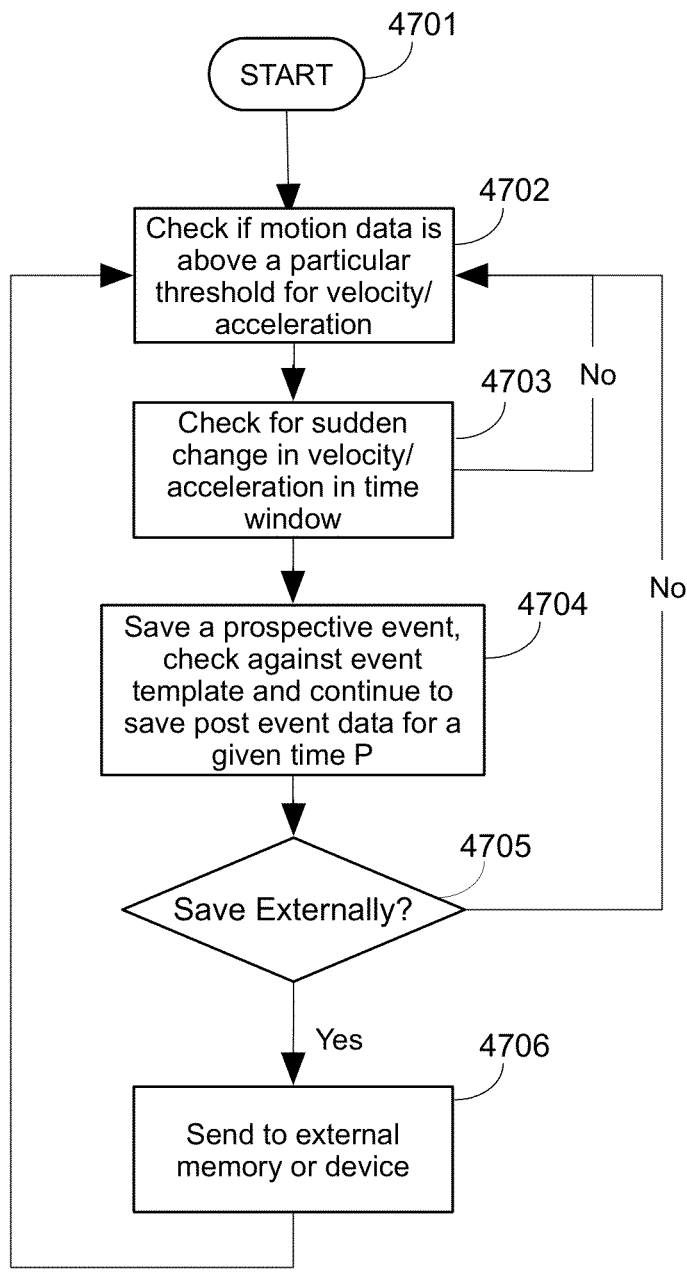
FIG. 12 shows a flow chart of an embodiment of the functionality specifically programmed into the microcontroller to determine whether a prospective event has occurred.

FIG. 12 shows a flow chart of an embodiment of the functionality specifically programmed into the microcontroller to determine whether an event that is to be transmitted for the particular application, for example a prospective event or for example an event has occurred. The motion, acceleration or shockwave that occurs from an impact to the sporting equipment is transmitted to the sensor in the motion capture element, which records the motion capture data as is described in FIG. 11 above. The microcontroller is configured to then analyze the event and determine whether the event is a prospective event or not.

One type of event that occurs is acceleration or a head/helmet/cap/mouthpiece based sensor over a specified linear or rotational value, or the impact of the clubface when it impacts a golf ball. In other sports that utilize a ball and a striking implement, the same analysis is applied, but tailored to the specific sport and sporting equipment. In tennis a prospective strike can be the racquet hitting the ball, for example as opposed to spinning the racquet before receiving a serve. In other applications, such as running shoes, the impact detection algorithm can detect the shoe hitting the ground when someone is running. In exercise it can be a particular motion being achieved, this allows for example the counting of repetitions while lifting weights or riding a stationary bike.

In one or more embodiments of the invention, processing starts at 4701. The microcontroller compares the motion capture data in memory 4610 with linear velocity over a certain threshold at 4702, within a particular impact time frame and searches for a discontinuity threshold where there is a sudden change in velocity or acceleration above a certain threshold at 4703. If no discontinuity in velocity or for example acceleration occurs in the defined time window, then processing continues at 4702. If a discontinuity does occur, then the prospective impact is saved in memory and post impact data is saved for a given time P at 4704. For example, if the impact threshold is set to 12G, discontinuity threshold is set to 6G, and the impact time frames is 10 frames, then microcontroller 3802 signals impact, after detection of a 12G acceleration in at least one axis or all axes within 10 frames followed by a discontinuity of 6G. In a typical event, the accelerations build with characteristic accelerations curves. Impact is signaled as a quick change in acceleration/velocity. These changes are generally distinct from the smooth curves created by an incrementally increasing or decreasing curves of a particular non-event. For concussion based events, linear or rotational acceleration in one or more axes is over a threshold. For golf related events, if the acceleration curves are that of a golf swing, then particular axes have particular accelerations that fit within a signature, template or other pattern and a ball strike results in a large acceleration strike indicative of a hit. If the data matches a given template, then it is saved, if not, it processing continues back at 4702. If data is to be saved externally as determined at 4705, i.e., there is a communication link to a mobile device and the mobile device is polling or has requested impact data when it occurs for example, then the event is transmitted to an external memory, or the mobile device or saved externally in any other location at 4706 and processing continues again at 4702 where the microcontroller analyzes collected motion capture data for subsequent events. If data is not to be saved externally, then processing continues at 4702 with the impact data saved locally in memory 4601. In one or more embodiments of the invention, noise may be filtered from the motion capture data before sending, and the sample rate may be varied based on the data values obtained to maximize accuracy. For example, some sensors output data that is not accurate under high sampling rates and high G-forces. Hence, by lowering the sampling rate at high G-forces, accuracy is maintained. In one or more embodiments of the invention, the microcontroller associated with motion capture element 111 may sense high G forces and automatically switch the sampling rate. In one or more embodiments, instead of using accelerometers with 6G/12G/24G ranges or 2G/4G/8G/16G ranges, accelerometers with 2 ranges, for example 2G and 24G may be utilized to simplify the logic of switching between ranges.

One or more embodiments of the invention may transmit the event to a mobile device and/or continue to save the events in memory, for example for a round of golf or until a mobile device communication link is achieved.

Figure 13:
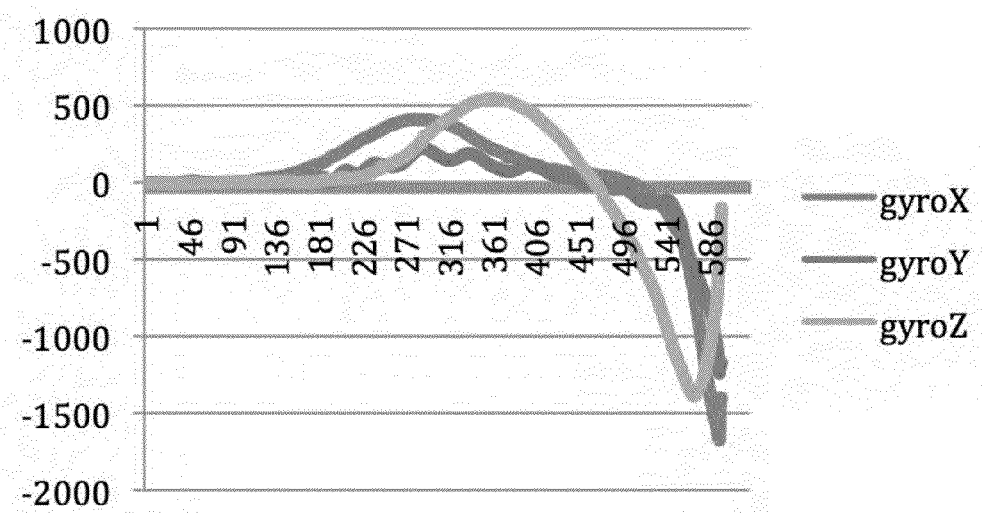
FIG. 13 illustrates a typical event signature or template, which is compared to motion capture data to eliminate false positive events.
Figure 15:
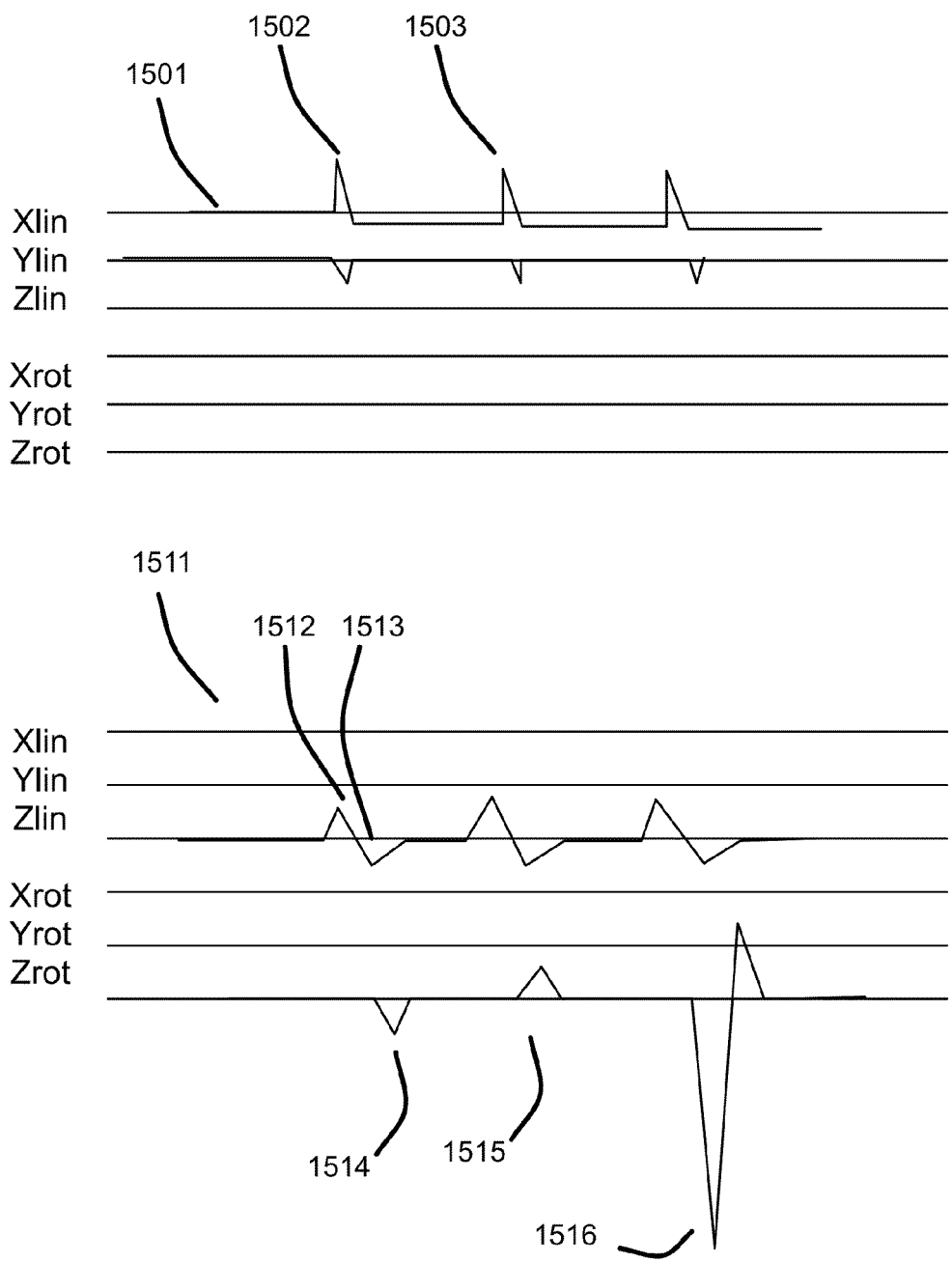
FIG. 15 illustrates an embodiment of templates characteristic of motion events associated with different types of equipment and/or instrumented clothing along with areas in which the motion capture sensor personality may change to more accurately or more efficiently capture data associated with a particular period of time and/or sub-event.

For example, with the sensor mounted in a particular mount, a typical event signature is shown in FIG. 13, also see FIG. 15 for comparison of two characteristic motion types as shown via patterns or templates associated with different pieces of equipment or clothing for example. In one or more embodiments, the microcontroller is configured to execute a pattern matching algorithm to follow the curves for each of the axis and use segments of 1 or more axis to determine if a characteristic swing has taken place, in either linear or rotational acceleration or any combination thereof. If the motion capture data in memory 4601 is within a range close enough to the values of a typical swing as shown in FIG. 13, then the motion is consistent with an event. Embodiments of the invention thus reduce the number of false positives in event detection, after first characterizing the angular and/or linear velocity signature of the movement, and then utilizing elements of this signature to determine if similar signatures for future events have occurred.

The motion capture element collects data from various sensors. The data capture rate may be high and if so, there are significant amounts of data that is being captured. Embodiments of the invention may use both lossless and lossy compression algorithms to store the data on the sensor depending on the particular application. The compression algorithms enable the motion capture element to capture more data within the given resources. Compressed data is also what is transferred to the remote computer(s). Compressed data transfers faster. Compressed data is also stored in the Internet "in the cloud", or on the database using up less space locally.

FIG. 14 illustrates an embodiment of the motion capture element 111 configured with optional LED visual indicator 1401 for local display and viewing of event related information and an optional LCD 1402 configured to display a text or encoded message associated with the event. In one or more embodiments, the LED visual indicator may flash slow yellow for a moderate type of concussion, and flash fast red for a severe type of concussion to give a quick overall view of the event without requiring any wireless communications. In addition, the LED may be asserted with a number of flashes or other colors to indicate any temperature related event or other event. One or more embodiments may also employ LCD 1402 for example that may show text, or alternatively may display a coded message for sensitive health related information that a referee or medical personnel may read or decode with an appropriate reader app on a mobile device for example. In the lower right portion of the figure, the LCD display may produce an encoded message that states "Potential Concussion 1500 degree/s/s rotational event detect—alert medical personnel immediately". Other paralysis diagnostic messages or any other type of message that may be sensitive may be encoded and displayed locally so that medical personnel may immediately begin assessing the user/player/boxer without alarming other players with the diagnostic message for example, or without transmitting the message over the air wirelessly to avoid interception.

FIG. 15 illustrates an embodiment of templates characteristic of motion events associated with different types of equipment and/or instrumented clothing along with areas in which the motion capture sensor personality may change to more accurately or more efficiently capture data associated with a particular period of time and/or sub-event. As shown, the characteristic push off for a skateboard is shown in acceleration graphs 1501 that display the X, Y and Z axes linear acceleration and rotational acceleration values in the top 6 timelines, wherein time increases to the right. As shown, discrete positive x axis acceleration captured is shown at 1502 and 1503 while the user pushes the skateboard with each step, followed by negative acceleration as the skateboard slows between each push. In addition, y axis wobbles during each push are also captured while there is no change in the z axis linear acceleration and no rotational accelerations in this characteristic template or pattern of a skateboard push off or drive. Alternatively, the pattern may include a group of threshold accelerations in x at predefined time windows with other thresholds or no threshold for wobble for example that the captured data is compared against to determine automatically the type of equipment that the motion capture element is mounted to or that the known piece of equipment is experiencing currently. This enables event based data saving and transmission for example.

The pattern or template in graphs 1511 however show a running event as the user slightly accelerates up and down during a running event. Since the user's speed is relatively constant there is relatively no acceleration in x and since the user is not turning, there is relatively no acceleration in y (left/right). This pattern may be utilized to compare within ranges for running for example wherein the pattern includes z axis accelerations in predefined time windows. Hence, the top three graphs of graphs 1511 may be utilized as a pattern to notate a running event. The bottom three graphs may show captured data that are indicative of the user looking from side to side when the motion capture element is mounted in a helmet and/or mouthpiece at 1514 and 1515, while captured data 1516 may be indicative of a moderate or sever concussion observed via a rotational motion of high enough angular degrees per second squared. In addition, the sensor personality may be altered dynamically at 1516 or at any other threshold for example to change the motion capture sensor rate of capture or bit size of capture to more accurately in amplitude or time capture the event. This enables dynamic alteration of quality of capture and/or dynamic change of power utilization for periods of interest, which is unknown in the art. In one or more embodiments, a temperature timeline may also be recorded for embodiments of the invention that utilize temperature sensors, either mounted within a helmet, mouthpiece or in any other piece of equipment or within the user's body for example.

Figure 16:
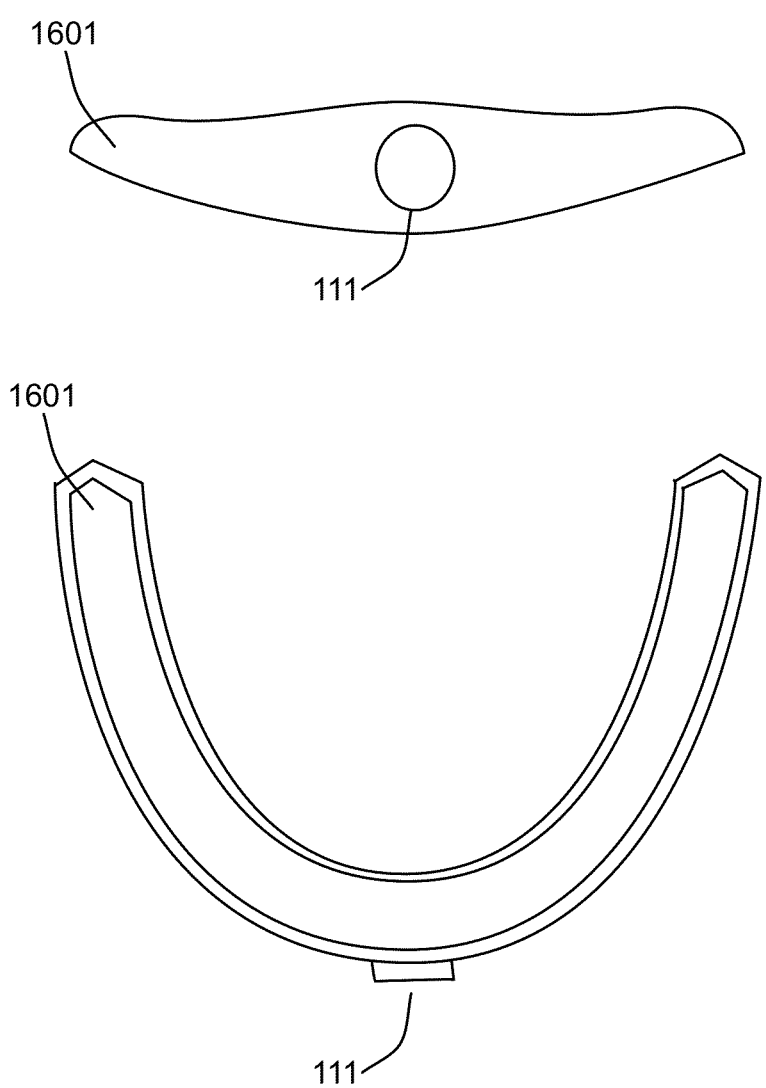
FIG. 16 illustrates an embodiment of a protective mouthpiece in front view and at the bottom portion of the figure in top view, for example as worn in any contact sport such as, but not limited to soccer, boxing, football, wrestling or any other sport for example.

FIG. 16 illustrates an embodiment of a protective mouthpiece 1601 in front view and at the bottom portion of the figure in top view, for example as worn in any contact sport such as, but not limited to soccer, boxing, football, wrestling or any other sport for example. Embodiments of the mouthpiece may be worn in addition to any other headgear with or without a motion capture element to increase the motion capture data associated with the user and correlate or in any other way combine or compare the motion data and or events from any or all motion capture elements worn by the user. Embodiments of the mouthpiece and/or helmet shown in FIGS. 2A-B or in any other piece of equipment may also include a temperature sensor for example and as previously discussed.

FIG. 17 illustrates an embodiment of the algorithm utilized by any computer in FIG. 1 that is configured to display motion images and motion capture data in a combined format. In one or more embodiments, the motion capture data and any event related start/stop times may be saved on the motion capture element 111. When a communication channel is available, motion capture data and any event related start/stop times are pushed to, or obtained by or otherwise received by any computer, e.g., 101, 102, 102a, 102b, 105 at 1701. The clock difference between the clock on the sensor and/or in motion capture data times may also be obtained. This may be performed by reading a current time stamp in the incoming messages and comparing the incoming message time with the current time of the clock of the local computer. The difference in clocks from the sensor and computer may be utilized to request images data from any camera local or pointing at the location of the event for the adjusted times to take into account any clock difference at 1702. For example, the computer may request images taken at the time/location by querying all cameras 103, 104, or on devices 101, 102 and/or 102a for any or all such devices having images taken nearby, e.g., based on GPS location or wireless range, and/or pointed at the event obtained from motion capture element 111. If a device is not nearby, but is pointing at the location of the event, as determined by its location and orientation when equipped with a magnetometer for example, then it may respond as well with images for the time range. Any type of camera that may communicate electronically may be queried, including nanny cameras, etc. For example, a message may be sent by mobile computer 101 after receiving events from motion capture sensor 111 wherein the message may be sent to any cameras for example within wireless range of mobile device 101. Alternatively, or in combination, mobile device 101 may send a broadcast message asking for any cameras identities that are within a predefined distance from the location of the event or query for any cameras pointed in the direction of the event even if not relatively close. Upon receiving the list of potential cameras, mobile device 101 may query them for any images obtained in a predefined window around the event for example. The computer may receive image data or look up the images locally if the computer is coupled with a camera at 1703. Although wireless communications may be utilized, any other form of transfer of image data is in keeping with the spirit of the invention. The data from the event whether in numerical or graphical overlay format or any other format including text may be overlaid onto the corresponding image for that time at 1704. This is shown graphically at time 1710, i.e., the current time, which may be scrollable for example, for image 1711 showing a frame of a motion event with overlaid motion capture data 1712.

While the ideas herein disclosed has been described by means of specific embodiments and applications thereof, numerous modifications and variations could be made thereto by those skilled in the art without departing from the scope of the invention set forth in the claims.

What is claimed is:

1. A motion event recognition system comprising:
    at least one motion capture element configured to couple with a user or piece of equipment or mobile device coupled with the user, wherein said at least one motion capture element comprises
        a memory;
        a sensor configured to capture any combination of values associated with an orientation, position, velocity, and acceleration of said at least one motion capture element;
        a radio;
        a microcontroller coupled with said memory, said sensor and said radio, wherein said microcontroller is configured to
            collect data that comprises sensor values from said sensor;
            store said data in said memory;
            analyze said data and recognize an event within said data to determine event data;
            transmit said event data associated with said event via said radio;
    a mobile device comprising
        a computer; and,
        a wireless communication interface configured to communicate with said radio to obtain said event data associated with said event;
        wherein said computer is coupled with wireless communication interface, wherein said computer is configured to
            receive said event data from said wireless communication interface;
            analyze said event data to form motion analysis data;
            store said event data, or said motion analysis data, or both said event data and said motion analysis data; and
            display information comprising said event data, or said motion analysis data, or both associated with said at least one user on a display;
        wherein said at least one motion capture sensor is configured to be worn near the user's head and wherein said recognize said event within said data comprises calculation of a location of impact on the user's head.

2. The system of claim 1 wherein said at least one motion capture sensor is configured to couple with a hat or cap or mouthpiece.

3. The system of claim 1 wherein said at least one motion capture sensor is configured to couple with a helmet and wherein said recognize said event within said data comprises calculation of the location of impact on the user's head based on the physical geometry of the helmet.

4. The system of claim 1 further comprising an isolator configured to surround said at least one motion capture element to approximate physical acceleration dampening of cerebrospinal fluid around said user's brain to minimize translation of linear acceleration and rotational acceleration of said event data to obtain an observed linear acceleration and an observed rotational acceleration of the user's brain.

5. The system of claim 1 wherein said recognize said event within said data comprises calculation of a linear acceleration value or of a rotational acceleration value or both.

6. The system of claim 1 wherein said transmit of said event data associated with said event comprises a connectionless broadcast message.

7. The system of claim 1 wherein said computer is further configure to
    access previously stored event data or motion analysis data associated with said user or piece of equipment;
    wherein said display information comprises a presentation of said event data associated with said at least one user on a display based on
        said event data or motion analysis data associated with said user or piece of equipment
        and
        said previously stored event data or motion analysis data associated with said user or piece of equipment
        or
        said previously stored motion capture data or motion analysis data associated with at least one other user or other piece of equipment.

8. The system of claim 1 wherein said display information comprises acceptance of sub-event time locations to provide discrete scrolling.

9. The system of claim 1 further comprising:
    an identifier coupled with said at least one motion capture sensor or said user or said piece of equipment;
    said computer further configured to
        receive said identifier; and
        associate said identifier with said event data and motion analysis data.

10. The system of claim 1 wherein said at least one motion capture element further comprises a light emitting element configured to output light if said event occurs.

11. The system of claim 1 wherein said at least one motion capture element further comprises an audio output element configured to output sound if said event occurs or if said at least one motion capture sensor is out of range of said computer or wherein said computer is configured to display and alert if said at least one motion capture sensor is out of range of said computer, or any combination thereof.

12. The system of claim 1 wherein said at least one motion capture element further comprises a location determination element coupled with said microcontroller.

13. The system of claim 1 wherein said microcontroller or said computer is configured to determine a location of said event or wherein said microcontroller and said computer are configured to determine the location of said event and correlate the location.

14. The system of claim 1 wherein said computer is further configured to request at least one image or video that contains said event from at least one camera proximal to said event.

15. The system of claim 1 wherein said computer is further configured to broadcast a request for camera locations proximal to said event or oriented to view said event.

16. The system of claim 1 wherein said computer is further configured to display a list of one or more times at which said event has occurred.

17. The system of claim 1 wherein at least one motion capture sensor is physically coupled with said mobile device.

18. The system of claim 1 wherein the microcontroller is coupled with a temperature sensor and wherein said microcontroller is configured to transmit a temperature obtained from the temperature sensor as a temperature event.

19. The system of claim 1 wherein said event comprises motion indicative of standing, walking, falling, heat stroke, a seizure, violent shaking, a concussion, a collision, abnormal gait, abnormal or non-existent breathing or any combination thereof.

20. A motion event recognition system comprising:
at least one motion capture element configured to couple with a user or piece of equipment or mobile device coupled with the user, wherein said at least one motion capture element comprises
a memory;
a sensor configured to capture any combination of values associated with an orientation, position, velocity, acceleration of said at least one motion capture element;
a radio;
a microcontroller coupled with said memory, said sensor and said radio wherein said microcontroller is configured to
collect data that comprises sensor values from said sensor;
store said data in said memory;
analyze said data and recognize an event within said data to determine event data;
transmit said event data associated with said event via said radio;
a mobile device comprising
a computer;
a wireless communication interface configured to communicate with said radio to obtain said event data associated with said event;
wherein said computer is coupled with wireless communication interface wherein said computer is configured to
receive said event data from said wireless communication interface;
analyze said event data to form motion analysis data;
store said event data, or said motion analysis data, or both said event data and said motion analysis data;
display information comprising said event data, or said motion analysis data, or both associated with said at least one user on a display; and an isolator configured to surround said at least one motion capture element to approximate physical acceleration dampening of cerebrospinal fluid around said user's brain to minimize translation of linear acceleration and rotational acceleration of said event data to obtain an observed linear acceleration and an observed rotational acceleration of the user's brain.

21. A motion event recognition system comprising:
at least one motion capture element configured to couple with a user or piece of equipment or mobile device coupled with the user, wherein said at least one motion capture element comprises
a memory;
a sensor configured to capture any combination of values associated with an orientation, position, velocity, acceleration of said at least one motion capture element;
a radio;
a microcontroller coupled with said memory, said sensor and said radio wherein said microcontroller is configured to
collect data that comprises sensor values from said sensor;
store said data in said memory;
analyze said data and recognize an event within said data to determine event data;
transmit said event data associated with said event via said radio;
a mobile device comprising
a computer;
a wireless communication interface configured to communicate with said radio to obtain said event data associated with said event;
wherein said computer is coupled with wireless communication interface wherein said computer is configured to
receive said event data from said wireless communication interface;
analyze said event data to form motion analysis data;
store said event data, or said motion analysis data, or both said event data and said motion analysis data;
display information comprising said event data, or said motion analysis data, or both associated with said at least one user on a display; and,
access previously stored event data or motion analysis data associated with said user or piece of equipment;
wherein said display information comprises a presentation of said event data associated with said at least one user on a display based on
said event data or motion analysis data associated with said user or piece of equipment
and
said previously stored event data or motion analysis data associated with said user or piece of equipment
or
said previously stored motion capture data or motion analysis data associated with at least one other user or other piece of equipment.

22. A motion event recognition system comprising:
at least one motion capture element configured to couple with a user or piece of equipment or mobile device coupled with the user, wherein said at least one motion capture element comprises a memory;

a sensor configured to capture any combination of values associated with an orientation, position, velocity, acceleration of said at least one motion capture element;

a radio;

a microcontroller coupled with said memory, said sensor and said radio wherein said microcontroller is configured to collect data that comprises sensor values from said sensor;

store said data in said memory;

analyze said data and recognize an event within said data to determine event data;

transmit said event data associated with said event via said radio;

a mobile device comprising a computer;

a wireless communication interface configured to communicate with said radio to obtain said event data associated with said event;

wherein said computer is coupled with wireless communication interface wherein said computer is configured to receive said event data from said wireless communication interface;

analyze said event data to form motion analysis data;

store said event data, or said motion analysis data, or both said event data and said motion analysis data;

display information comprising said event data, or said motion analysis data, or both associated with said at least one user on a display;

wherein said at least one motion capture element further comprises an audio output element configured to output sound if said event occurs or if said at least one motion capture sensor is out of range of said computer or wherein said computer is configured to display and alert if said at least one motion capture sensor is out of range of said computer, or any combination thereof.

23. A motion event recognition system comprising:

at least one motion capture element configured to couple with a user or piece of equipment or mobile device coupled with the user, wherein said at least one motion capture element comprises a memory;

a sensor configured to capture any combination of values associated with an orientation, position, velocity, acceleration of said at least one motion capture element;

a radio;

a microcontroller coupled with said memory, said sensor and said radio wherein said microcontroller is configured to collect data that comprises sensor values from said sensor;

store said data in said memory;

analyze said data and recognize an event within said data to determine event data;

transmit said event data associated with said event via said radio;

a mobile device comprising a computer;

a wireless communication interface configured to communicate with said radio to obtain said event data associated with said event;

wherein said computer is coupled with wireless communication interface wherein said computer is configured to receive said event data from said wireless communication interface;

analyze said event data to form motion analysis data;

store said event data, or said motion analysis data, or both said event data and said motion analysis data;

display information comprising said event data, or said motion analysis data, or both associated with said at least one user on a display; and broadcast a request for camera locations proximal to said event or oriented to view said event.

* * * * *